US011134371B2

(12) United States Patent
Jing et al.

(10) Patent No.: US 11,134,371 B2
(45) Date of Patent: Sep. 28, 2021

(54) COMMUNICATION METHOD AND COMMUNICATIONS APPARATUS

(71) Applicant: Huawei Technologies Co., Ltd., Shenzhen (CN)

(72) Inventors: Hao Jing, Mougins (FR); Zaifeng Zong, Nanjing (CN); Fenqin Zhu, Shanghai (CN); Mirko Schramm, Berlin (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/845,026

(22) Filed: Apr. 9, 2020

(65) Prior Publication Data
US 2020/0267529 A1   Aug. 20, 2020

Related U.S. Application Data

(63) Continuation of application No. PCT/CN2019/109136, filed on Sep. 29, 2019.

(30) Foreign Application Priority Data

Feb. 19, 2019  (CN) .......................... 201910123361.8
Mar. 15, 2019  (CN) .......................... 201910196769.8

(51) Int. Cl.
*H04W 8/08*    (2009.01)
*H04W 80/10*   (2009.01)
*H04W 60/00*   (2009.01)
*H04W 28/02*   (2009.01)
*H04W 56/00*   (2009.01)

(52) U.S. Cl.
CPC .......... *H04W 8/08* (2013.01); *H04W 28/0268* (2013.01); *H04W 56/001* (2013.01); *H04W 60/00* (2013.01); *H04W 80/10* (2013.01)

(58) Field of Classification Search
CPC . H04W 8/08; H04W 28/0268; H04W 56/001; H04W 60/00; H04W 80/10
(Continued)

(56) References Cited

U.S. PATENT DOCUMENTS 10,986,667 B2 *  4/2021  Loehr ............... H04W 28/0278
2009/0264131 A1  10/2009  Wu et al.
(Continued)

FOREIGN PATENT DOCUMENTS

CA       3057183 A1    9/2018
CN       101365230 A   2/2009
(Continued)

OTHER PUBLICATIONS

S2-1810122, Ericsson, "Data Off Deactivated when Session Management Back Off timer is running," 3GPP SA WG2 Meeting #129, Dongguan, China, Oct. 15-19, 2018, 7 pages.
(Continued)

*Primary Examiner* — Nghi H Ly
(74) *Attorney, Agent, or Firm* — Conley Rose, P.C.

(57) ABSTRACT

A communication method applicable to different scenarios of interworking between communications systems includes determining, by a session management network element, a first data channel in a first system, where the first data channel is a data channel to be synchronized with a terminal device; and synchronizing, by the session management network element in an interworking procedure for the terminal device from the first system to a second system, at least one of the first data channel or a second data channel that is in the second system and that corresponds to the first data channel.

20 Claims, 13 Drawing Sheets

(58) Field of Classification Search
USPC .............. 370/329, 328, 338, 341, 345, 350
See application file for complete search history.

(56) References Cited

U.S. PATENT DOCUMENTS

| | | | |
|---|---|---|---|
| 2010/0260143 | A1 | 10/2010 | Tanabe et al. |
| 2015/0244791 | A1* | 8/2015 | Sundaram ............ H04L 67/1021 |
| | | | 709/203 |
| 2017/0135010 | A1 | 5/2017 | Iwai et al. |
| 2017/0237479 | A1* | 8/2017 | Kim ................. H04B 7/0478 |
| | | | 370/329 |
| 2018/0199398 | A1 | 7/2018 | Dao et al. |
| 2018/0376384 | A1 | 12/2018 | Youn et al. |
| 2019/0215870 | A1* | 7/2019 | Babaei ................ H04W 24/10 |
| 2020/0068449 | A1 | 2/2020 | Jin et al. |

FOREIGN PATENT DOCUMENTS

| | | | |
|---|---|---|---|
| CN | 101568113 A | 10/2009 | |
| CN | 101902732 A | 12/2010 | |
| CN | 103327547 A | 9/2013 | |
| CN | 105636009 A | 6/2016 | |
| CN | 108605269 A | 9/2018 | |

OTHER PUBLICATIONS

3GPP TS 23.502, V15.4.1, "3rd Generation Partnership Project; Technical Specification Group Services and System Aspects; Procedures for the 5G System; Stage 2 (Release 15)," Jan. 2019, 347 pages.
3GPP TS 23.501, V15.4.0, "3rd Generation Partnership Project; Technical Specification Group Services and System Aspects; System Architecture for the 5G System; Stage 2 (Release 15)," Dec. 2018, 236 pages.
3GPP TS 24.301, V15.5.0, "3rd Generation Partnership Project; Technical Specification Group Core Network and Terminals; Non-Access-Stratum (NAS) protocol for Evolved Packet System (EPS); Stage 3 (Release 15)," Dec. 2018, 536 pages.
3GPP TSG-SA WG2 Meeting #131,S2-1901614: "Provision of cause code by (R)AN to the UE for N2 context rel command from AMF",OPPO,Tenerife (Spain), Feb. 25-Mar. 1, 2019, 4 pages.

* cited by examiner

200

> A session management network element determines a first data channel in a first system, where the first data channel is a data channel to be synchronized with a terminal device — S210

> The session management network element synchronizes, in an interworking procedure for the terminal device from the first system to a second system, at least one of the first data channel or a second data channel that is in the second system and that corresponds to the first data channel — S220

> A mobility management network element in a second system determines a first data channel in a first system, where the first data channel is a data channel to be synchronized with a terminal device — S310

> The mobility management network element in the second system synchronizes, in an interworking procedure for the terminal device from the first system to the second system, at least one of the first data channel or a second data channel that is in the second system and that corresponds to the first data channel — S320

| A terminal device determines a first data channel in a first system, where the first data channel is a data channel to be synchronized with a session management network element | — S410 |

| The terminal device synchronizes, in an interworking procedure for the terminal device from the first system to a second system, at least one of the first data channel or a second data channel that is in the second system and that corresponds to the first data channel | — S420 |

FIG. 4

COMMUNICATION METHOD AND COMMUNICATIONS APPARATUS

CROSS-REFERENCE TO RELATED APPLICATIONS

This application is a continuation of International Patent Application No. PCT/CN2019/109136, filed on Sep. 29, 2019, which claims priority to Chinese Patent Application No. 201910196769.8, filed on Mar. 15, 2019 and claims priority to Chinese Patent Application No. 201910123361.8, filed on Feb. 19, 2019. The disclosures of the aforementioned applications are hereby incorporated by reference in their entireties.

TECHNICAL FIELD

This application relates to the communication field, and in particular, to a communication method and a communications apparatus.

BACKGROUND

With development of communications technologies, a new communications system gradually replaces an old communications system. However, this replacement process usually takes several years. In other words, the new communications system and the old communications system coexist in a relatively long period of time. Therefore, ensuring normal interworking between the new communications system and the old communications system is an issue that cannot be ignored.

A scenario in which a fourth-generation (4G) communications system and a fifth-generation (5G) communications system coexist is used as an example. A core network element and a terminal device may need to interwork from the 4G communications system to the 5G communications system, or may need to interwork from the 5G communications system to the 4G communications system. The terminal device and the core network element cannot always normally communicate with each other. For example, when the terminal device is in an idle state or a communication fault occurs, the terminal device cannot receive a message sent by the core network element. Consequently, a communication failure may occur after the terminal device and the core network device interwork between the communications systems. How to improve reliability during interworking between communications systems is a problem that needs to be urgently resolved currently.

SUMMARY

This application provides a communication method, and the method is applicable to a scenario in which a 4G communications system and a 5G communications system coexist. A communications device to which the method is applied determines a data channel that needs to be synchronized in a procedure of interworking between communications systems, and performs synchronization processing, so that pieces of data channel information stored in communications devices are consistent after interworking is performed between the communications systems. This avoids a case in which a communication failure may occur after interworking is performed between the communications systems.

According to a first aspect, a communication method is provided, including determining, by a session management network element, a first data channel in a first system, where the first data channel is a data channel to be synchronized with a terminal device; and synchronizing, by the session management network element in an interworking procedure for the terminal device from the first system to a second system, at least one of the first data channel or a second data channel that is in the second system and that corresponds to the first data channel, where for example, the first data channel is a data channel that has been deleted by the terminal device but not notified to a network side.

The session management network element may determine, before interworking is performed between communications systems, the data channel that needs to be synchronized with the terminal device, or may determine, in a procedure of interworking between communications systems, the data channel that needs to be synchronized with the terminal device. Then, the session management network element performs synchronization processing in the procedure of interworking between the communications systems, and deletes information about the first data channel and/or information about the second data channel that are/is locally stored, or indicates to the terminal device to delete information about the first data channel and/or information about the second data channel, to complete synchronization processing of the data channel. In the foregoing solution, pieces of data channel information stored in communications devices are consistent after interworking is performed between the communications systems. This avoids a case in which a communication failure may occur after interworking is performed between the communications systems.

In a possible implementation, the determining, by a session management network element, a first data channel in a first system includes receiving, by the session management network element, first status information, where the first status information indicates a status of a data channel in the terminal device; and determining, by the session management network element, the first data channel based on the first status information.

The session management network element may compare locally stored data channel information with data channel information that is indicated by the first status information and that is stored in the terminal device, and a data channel corresponding to inconsistent information in the two pieces of data channel information is the first data channel. Because data channel information stored in another core network element is information obtained from the session management network element, and may not be updated in time, an error that may occur when the another core network element determines the to-be-synchronized data channel can be avoided in the foregoing solution.

In a possible implementation, the determining, by a session management network element, a first data channel in a first system includes sending, by the session management network element, a protocol configuration option PCO to the terminal device; and when the session management network element receives a response message that does not carry the PCO, determining, by the session management network element, the first data channel.

The PCO is dedicated information between the session management network element and the terminal device, and another network element only transparently transmits the PCO. Therefore, if the session management network element does not receive the response message that includes the PCO, it indicates that a problem occurs in communication between the session management network element and the terminal device, and a data channel deleted by the session management network element previously may not be deleted on a terminal device side. Therefore, the session management network element may determine the first data channel according to the foregoing solution. Because no new information is added to the foregoing solution, if the first data channel is determined by using the solution, some approaches can be better compatible with.

In a possible implementation, the PCO includes at least one of information about the first data channel or information about the second data channel.

Alternatively, the session management network element may explicitly indicate, to the terminal device by using the PCO, a data channel that needs to be synchronized. Another core network element only needs to transparently transmit the PCO, and does not need to parse the PCO. In this way, load of the another core network element is relieved.

In a possible implementation, the determining, by a session management network element, a first data channel in a first system includes sending, by the session management network element, a first message to a mobility management network element in the first system, where the first message indicates to delete one or more data channels; receiving, by the session management network element, a second message from the mobility management network element in the first system, where the second message indicates that the first message is not notified to the terminal device; and determining, by the session management network element, the one or more data channels as the first data channel based on the second message.

In a possible implementation, the synchronizing, by the session management network element in an interworking procedure for the terminal device from the first system to a second system, at least one of the first data channel or a second data channel that is in the second system and that corresponds to the first data channel includes triggering, by the session management network element, a session modification procedure, where the session modification procedure is used to synchronize the at least one of the first data channel or the second data channel that is in the second system and that corresponds to the first data channel; or triggering, by the session management network element in a protocol data unit PDU session activation procedure or a PDN connection activation procedure, synchronization of the at least one of the first data channel or the second data channel that is in the second system and that corresponds to the first data channel.

The foregoing solution provides a plurality of optional manners for the session management network element to perform synchronization processing, and therefore is relatively flexible.

In a possible implementation, the synchronizing, by the session management network element in an interworking procedure for the terminal device from the first system to a second system, at least one of the first data channel or a second data channel that is in the second system and that corresponds to the first data channel includes deleting, by the session management network element, the at least one of the information about the first data channel or the information about the second data channel, where when the first system is a 4G system, and the second system is a 5G system, the information about the first data channel includes information about an evolved packet system EPS bearer, and the information about the second data channel includes information about a QoS flow associated with the EPS bearer; or when the first system is a 5G system, and the second system is a 4G system, the information about the first data channel includes information about a QoS flow, and the information about the second data channel includes information about an EPS bearer associated with the QoS flow.

According to a second aspect, this application further provides a communication method, including determining, by a mobility management network element in a second system, a first data channel in a first system, where the first data channel is a data channel to be synchronized with a terminal device; and synchronizing, by the mobility management network element in the second system in an interworking procedure for the terminal device from the first system to the second system, at least one of the first data channel or a second data channel that is in the second system and that corresponds to the first data channel.

The mobility management network element in the second system is a mobility management network element that communicates with the terminal device after interworking is performed between communications systems. The mobility management network element in the second system determines the data channel that needs to be synchronized with the terminal device. Then, the mobility management network element performs synchronization processing, and deletes information about the first data channel and/or information about the second data channel that are/is locally stored, or indicates to the terminal device to delete information about the first data channel and/or information about the second data channel, to complete synchronization processing of the data channel. In the foregoing solution, pieces of data channel information stored in communications devices are consistent after interworking is performed between the communications systems. This avoids a case in which a communication failure may occur after interworking is performed between the communications systems.

In a possible implementation, the determining, by a mobility management network element in a second system, a first data channel in a first system includes receiving, by the mobility management network element in the second system, first status information from the terminal device, where the first status information indicates a status of a data channel in the terminal device; receiving, by the mobility management network element in the second system, second status information from a mobility management network element in the first system, where the second status information indicates a status of a data channel in the terminal device; and determining, by the mobility management network element in the second system, the first data channel based on the first status information and the second status information.

The reason why a data channel is not synchronized may be that a problem occurs in a process of exchanging information between the terminal device and a core network element in an original communications system (namely, the first system) for data channel deletion. Therefore, the mobility management network element in the second system may compare data channel information stored in the mobility management network element in the first system with data channel information stored in the terminal device, and a data channel corresponding to inconsistent information in the two pieces of data channel information is the first data channel. The foregoing solution does not need to be performed by a session management network element, and therefore load of the session management network element is relieved.

In a possible implementation, the method further includes sending, by the mobility management network element in the second system, the first status information to a session management network element, where the first status information is used for determination of the first data channel.

The mobility management network element in the second system may further send the first status information to the session management network element, so that the session management network element compares data channel information stored in the session management network element with data channel information stored in the terminal device. A data channel corresponding to inconsistent information in the two pieces of data channel information is the first data channel. Because data channel information stored in another core network element is information obtained from the session management network element, and may not be updated in time, an error that may occur when the another core network element determines the to-be-synchronized data channel can be avoided in the foregoing solution.

According to a third aspect, this application further provides a communication method, including determining, by a terminal device, a first data channel in a first system, where the first data channel is a data channel to be synchronized with a session management network element; and synchronizing, by the terminal device in an interworking procedure for the terminal device from the first system to a second system, at least one of the first data channel or a second data channel that is in the second system and that corresponds to the first data channel.

The terminal device may determine, before interworking is performed between communications systems, the data channel that needs to be synchronized with the session management network element, or may determine, in a procedure of interworking between communications systems, the data channel that needs to be synchronized with the session management network element. Then, the terminal device performs synchronization processing in the procedure of interworking between the communications systems, and deletes information about the first data channel and/or information about the second data channel that are/is locally stored, or indicates to the session management network element to delete information about the first data channel and/or information about the second data channel, to complete synchronization processing of the data channel. In the foregoing solution, pieces of data channel information stored in communications devices are consistent after interworking is performed between the communications systems. This avoids a case in which a communication failure may occur after interworking is performed between the communications systems.

In a possible implementation, the determining, by a terminal device, a first data channel in a first system includes sending, by the terminal device, a notification message to the session management network element, where the notification message is used to notify the session management network element that the terminal device deletes one or more data channels; and determining, by the terminal device, the one or more data channels as the first data channel based on a response message indicating that the notification message is not received.

The terminal device may initiate a data channel deletion procedure. If the terminal device does not receive a response message of the notification message, it indicates that a problem occurs in communication between the terminal device and the session management network element, and a data channel that the terminal device prepares to delete or has deleted is not deleted by the session management network element. In this case, the terminal device may determine that the data channel that the terminal device prepares to delete or has deleted is the to-be-synchronized data channel, namely, the first data channel.

In a possible implementation, the method further includes sending, by the terminal device, first status information to a session management network element, where the first status information indicates a status of a data channel in the terminal device, and the first status information is used for determination of the first data channel.

Because the terminal device is in an idle state, the terminal device may not receive a message that is for deleting a data channel and that is sent by the session management network element. In this case, the terminal device may actively send the first status information to the session management network element, or the terminal device may send the first status information based on a request of a core network element, so that the session management network element determines whether the data channel needs to be synchronized.

Optionally, the determining, by a terminal device, a first data channel in a first system includes sending, by the terminal device, a first PCO to the session management network element; and when the terminal device receives a response message that does not carry the first PCO, determining, by the terminal device, the first data channel.

The PCO is dedicated information between the session management network element and the terminal device, and another network element only transparently transmits the PCO. Therefore, if the session management network element does not receive a response message that includes the first PCO, it indicates that a problem occurs in communication between the session management network element and the terminal device, and a data channel deleted by the session management network element previously may not be deleted on a terminal device side. Therefore, the session management network element may determine the first data channel according to the foregoing solution. Because no new information is added to the foregoing solution, if the first data channel is determined by using the solution, some approaches can be better compatible with.

In a possible implementation, the first PCO includes at least one of information about the first data channel or information about the second data channel.

The terminal device may alternatively explicitly indicate, to the session management network element by using the first PCO, a data channel that needs to be synchronized. Another core network element only needs to transparently transmit the first PCO, and does not need to parse the first PCO. Therefore, load of the another core network element is relieved.

Optionally, the determining, by a terminal device, a first data channel in a first system includes receiving, by the terminal device, second status information, where the second status information indicates a status of a data channel in the session management network element; and determining, by the terminal device, the first data channel based on the second status information.

The terminal device may further compare locally stored data channel information with data channel information that is indicated by the second status information and that is stored in the session management network element, and a data channel corresponding to inconsistent information in the two pieces of data channel information is the first data channel. Because data channel information stored in a mobility management network element is information obtained from the terminal device or the session management network element, and may not be updated in time, an error that may occur when the mobility management network element determines the to-be-synchronized data channel can be avoided in the foregoing solution.

In a possible implementation, the synchronizing, by the terminal device in an interworking procedure for the terminal device from the first system to a second system, at least one of the first data channel or a second data channel that is in the second system and that corresponds to the first data channel includes deleting, by the terminal device, at least one of information about the first data channel or information about the second data channel, where when the first system is a 4G system, and the second system is a 5G system, the information about the first data channel includes information about an EPS bearer, and the information about the second data channel includes information about a QoS flow associated with the EPS bearer; or when the first system is a 5G system, and the second system is a 4G system, the information about the first data channel includes information about a QoS flow, and the information about the second data channel includes information about an EPS bearer associated with the QoS flow.

In a possible implementation, the response message of the PCO indicates that the terminal device has deleted a to-be-deleted data channel, or the response message of the PCO indicates that the terminal device has determined to delete a to-be-deleted data channel, or the response message of the PCO indicates that the terminal device has received the PCO.

Optionally, the method further includes receiving, by the terminal device, a PCO from the session management network element; and sending, by the terminal device, a response message of the PCO to the session management network element, where the response message of the PCO includes no parameter, or the PCO includes the at least one of the information about the first data channel or the information about the second data channel.

The PCO is dedicated information between the session management network element and the terminal device, and another network element only transparently transmits the PCO. Therefore, a to-be-deleted data channel is determined between the terminal device and the session management network element by using the PCO, so as to improve efficiency of data channel synchronization.

In a possible implementation, the response message of the PCO indicates that the terminal device has deleted a to-be-deleted data channel, or the response message of the PCO indicates that the terminal device has determined to delete a to-be-deleted data channel, or the response message of the PCO indicates that the terminal device has received the PCO.

According to a fourth aspect, this application further provides a communication method, including a terminal device determines a first data channel that has been deleted by the terminal device in a first system but not notified to a network side. The terminal device sends first status information to a session management network element, and the first status information indicates a status of a data channel in the terminal device, and the first status information is used for determination of the first data channel. For example, the terminal device sends a first message to a mobility management network element. The first message includes the first status information, and the first message is an attach request message, a registration request message, or a session establishment request message. In the foregoing solution, pieces of data channel information stored in communications devices are consistent after interworking is performed between the communications systems. This avoids a case in which a communication failure may occur after interworking is performed between the communications systems.

According to a fifth aspect, this application further provides a communication method, including a session management network element deletes a first data channel in a first system, and the first data channel is a data channel to be synchronized with a terminal device. The session management network element sends information about a data channel to a mobility management network element in a second system, and the information about the data channel includes identification information of the data channel, or a correspondence between the identification information of the data channel and an allocation and retention priority (for example, for details, refer to a description of step 1209 in FIG. 12). In the foregoing solution, pieces of data channel information stored in communications devices are consistent after interworking is performed between the communications systems. This avoids a case in which a communication failure may occur after interworking is performed between the communications systems.

According to a sixth aspect, this application further provides a communication method, including a mobility management network element in a second system receives information about a data channel from a session management network element, and the information about the data channel includes identification information of the data channel, or a correspondence between the identification information of the data channel and an allocation and retention priority (for example, for details, refer to a description of step 1209 in FIG. 12). The mobility management network element determines status information based on the information about the data channel (for example, for details, refer to a description of step 1210 in FIG. 12). The mobility management network element sends the status information to a terminal device, (for example, for details, refer to descriptions of steps 1211 to 1213 in FIG. 12), and the status information is used by the terminal device side to synchronize at least one of a first data channel or a second data channel that is in the second system and that corresponds to the first data channel. The first data channel is a data channel to be synchronized with the terminal device. In the foregoing solution, pieces of data channel information stored in communications devices are consistent after interworking is performed between the communications systems. This avoids a case in which a communication failure may occur after interworking is performed between the communications systems.

According to a seventh aspect, this application further provides a communication method, including a terminal device receives status information from a mobility management network element in a second system (for example, for details, refer to descriptions of steps 1211 and 1212 in FIG. 12). The terminal device determines a first data channel based on the status information, and the first data channel is a data channel to be synchronized with the terminal device. The terminal device synchronizes at least one of the first data channel or a second data channel that is in the second system and that corresponds to the first data channel (for example, for details, refer to a description of step 1213 in FIG. 12). For example, the terminal device deletes at least one of information about the first data channel or information about the second data channel. When the first system is a 4G system, and the second system is a 5G system, the information about the first data channel includes information about an evolved packet system EPS bearer, and the information about the second data channel includes information about a QoS flow associated with the EPS bearer; or when the first system is a 5G system, and the second system is a 4G system, the information about the first data channel includes information about a QoS flow, and the information about the second data channel includes information about an EPS bearer associated with the QoS flow. In the foregoing solution, pieces of data channel information stored in communications devices are consistent after interworking is performed between the communications systems. This avoids a case in which a communication failure may occur after interworking is performed between the communications systems.

According to an eighth aspect, this application provides a communications apparatus. The communications apparatus may be a session management network element, or may be a chip in the session management network element. The communications apparatus may include a processing unit and a transceiver unit. When the apparatus is the session management network element, the processing unit may be a processor, and the transceiver unit may be a communications interface. The session management network element may further include a storage unit, and the storage unit may be a memory. The storage unit is configured to store an instruction, and the processing unit executes the instruction stored in the storage unit, so that the session management network element performs the method in the first aspect or the fifth aspect. When the apparatus is the chip in the session management network element, the processing unit may be a processor, and the transceiver unit may be an input/output interface, a pin, a circuit, or the like. The processing unit executes an instruction stored in a storage unit, so that the session management network element performs the method in the first aspect or the fifth aspect. The storage unit may be a storage unit (for example, a register or a cache) inside the chip, or may be a storage unit (for example, a read-only memory or a random access memory) outside the chip in the session management network element.

According to a ninth aspect, this application provides another communications apparatus. The apparatus may be a mobility management network element, or may be a chip in the mobility management network element. The apparatus may include a processing unit and a transceiver unit. When the apparatus is the mobility management network element, the processing unit may be a processor, and the transceiver unit may be a communications interface. The mobility management network element may further include a storage unit, and the storage unit may be a memory. The storage unit is configured to store an instruction, and the processing unit executes the instruction stored in the storage unit, so that the mobility management network element performs the method in the second aspect or the sixth aspect. When the apparatus is the chip in the mobility management network element, the processing unit may be a processor, and the transceiver unit may be an input/output interface, a pin, a circuit, or the like. The processing unit executes an instruction stored in a storage unit, so that the mobility management network element performs the method in the second aspect or the sixth aspect. The storage unit may be a storage unit (for example, a register or a cache) inside the chip, or may be a storage unit (for example, a read-only memory or a random access memory) outside the chip in the mobility management network element.

According to a tenth aspect, this application provides still another communications apparatus. The apparatus may be a terminal device, or may be a chip in the terminal device. The apparatus may include a processing unit and a transceiver unit. When the apparatus is the terminal device, the processing unit may be a processor, and the transceiver unit may be a transceiver. The terminal device may further include a storage unit, and the storage unit may be a memory. The storage unit is configured to store an instruction, and the processing unit executes the instruction stored in the storage unit, so that the terminal device performs the method in the third aspect, the fourth aspect, or the seventh aspect. When the apparatus is the chip in the terminal device, the processing unit may be a processor, and the transceiver unit may be an input/output interface, a pin, a circuit, or the like. The processing unit executes an instruction stored in a storage unit, so that the terminal device performs the method in the third aspect, the fourth aspect, or the seventh aspect. The storage unit may be a storage unit (for example, a register or a cache) in the chip, or may be a storage unit (for example, a read-only memory or a random access memory) outside the chip in the terminal device.

According to an eleventh aspect, this application provides a computer-readable storage medium. The computer-readable storage medium stores a computer program, and when the computer program is executed by a processor, the processor is enabled to perform the method in the first aspect or the fifth aspect.

According to a twelfth aspect, this application provides a computer-readable storage medium. The computer-readable storage medium stores a computer program, and when the computer program is executed by a processor, the processor is enabled to perform the method in the second aspect or the sixth aspect.

According to a thirteenth aspect, this application provides a computer-readable storage medium. The computer-readable storage medium stores a computer program, and when the computer program is executed by a processor, the processor is enabled to perform the method in the third aspect, the fourth aspect, or the seventh aspect.

According to a fourteenth aspect, this application provides a computer program product. The computer program product includes computer program code, and when the computer program code is executed by a processor, the processor is enabled to perform the method in the first aspect or the fifth aspect.

According to a fifteenth aspect, this application provides a computer program product. The computer program product includes computer program code, and when the computer program code is executed by a processor, the processor is enabled to perform the method in the second aspect or the sixth aspect.

According to a sixteenth aspect, this application provides a computer program product. The computer program product includes computer program code, and when the computer program code is executed by a processor, the processor is enabled to perform the method in the third aspect, the fourth aspect, or the seventh aspect.

According to a seventeenth aspect, this application further provides a communication method, including sending, by a session management network element, a deletion message and a PCO to a terminal device, where the deletion message indicates a to-be-deleted data channel; and determining, by the session management network element based on a response message indicating that the PCO is received, that the terminal device has deleted the to-be-deleted data channel, or determining that the terminal device has determined to delete the to-be-deleted data channel, or determining that the terminal device has received the deletion message.

The PCO is dedicated information between the session management network element and the terminal device, and another network element only transparently transmits the PCO. Therefore, the to-be-deleted data channel is determined between the terminal device and the session management network element by using the PCO, so as to improve efficiency of data channel synchronization.

In a possible implementation, the PCO includes information about the to-be-deleted data channel.

According to an eighteenth aspect, this application further provides a communication method, including receiving, by a terminal device, a deletion message and a PCO from a session management network element, where the deletion message indicates a to-be-deleted data channel; and sending, by the terminal device, a response message of the PCO to the session management network element, where the response message of the PCO indicates that the terminal device has deleted the to-be-deleted data channel, or the response message of the PCO indicates that the terminal device has determined to delete the to-be-deleted data channel, or the response message of the PCO indicates that the terminal device has received the deletion message.

The PCO is dedicated information between the session management network element and the terminal device, and another network element only transparently transmits the PCO. Therefore, the to-be-deleted data channel is determined between the terminal device and the session management network element by using the PCO, so as to improve efficiency of data channel synchronization.

Optionally, the PCO includes information about the to-be-deleted data channel.

According to a nineteenth aspect, this application provides a communications apparatus. The apparatus may be a session management network element, or may be a chip in the session management network element. The apparatus may include a processing unit and a transceiver unit. When the apparatus is the session management network element, the processing unit may be a processor, and the transceiver unit may be a communications interface. The session management network element may further include a storage unit, and the storage unit may be a memory. The storage unit is configured to store an instruction, and the processing unit executes the instruction stored in the storage unit, so that the session management network element performs the method in the seventeenth aspect. When the apparatus is the chip in the session management network element, the processing unit may be a processor, and the transceiver unit may be an input/output interface, a pin, a circuit, or the like. The processing unit executes an instruction stored in a storage unit, so that the session management network element performs the method in the seventeenth aspect. The storage unit may be a storage unit (for example, a register or a cache) inside the chip, or may be a storage unit (for example, a read-only memory or a random access memory) outside the chip in the session management network element.

According to a twentieth aspect, this application provides another communications apparatus. The apparatus may be a terminal device, or may be a chip in the terminal device. The apparatus may include a processing unit and a transceiver unit. When the apparatus is the terminal device, the processing unit may be a processor, and the transceiver unit may be a transceiver. The terminal device may further include a storage unit, and the storage unit may be a memory. The storage unit is configured to store an instruction, and the processing unit executes the instruction stored in the storage unit, so that the terminal device performs the method in the eighteenth aspect. When the apparatus is the chip in the terminal device, the processing unit may be a processor, and the transceiver unit may be an input/output interface, a pin, a circuit, or the like. The processing unit executes an instruction stored in a storage unit, so that the terminal device performs the method in the eighteenth aspect. The storage unit may be a storage unit (for example, a register or a cache) in the chip, or may be a storage unit (for example, a read-only memory or a random access memory) outside the chip in the terminal device.

According to a twenty-first aspect, this application provides a computer-readable storage medium. The computer-readable storage medium stores a computer program, and when the computer program is executed by a processor, the processor is enabled to perform the method in the seventeenth aspect.

According to a twenty-second aspect, this application provides a computer-readable storage medium. The computer-readable storage medium stores a computer program, and when the computer program is executed by a processor, the processor is enabled to perform the method in the eighteenth aspect.

According to a twenty-third aspect, this application provides a computer program product. The computer program product includes computer program code, and when the computer program code is executed by a processor, the processor is enabled to perform the method in the seventeenth aspect.

According to a twenty-fourth aspect, this application provides a computer program product. The computer program product includes computer program code, and when the computer program code is executed by a processor, the processor is enabled to perform the method in the eighteenth aspect.

BRIEF DESCRIPTION OF DRAWINGS

FIG. 2 is a schematic diagram of a communication method according to this application;

FIG. 3 is a schematic diagram of another communication method according to this application;

FIG. 4 is a schematic diagram of still another communication method according to this application;

DESCRIPTION OF EMBODIMENTS

The following describes technical solutions of this application with reference to accompanying drawings. A scenario applicable to this application is first described.

Figure 1:
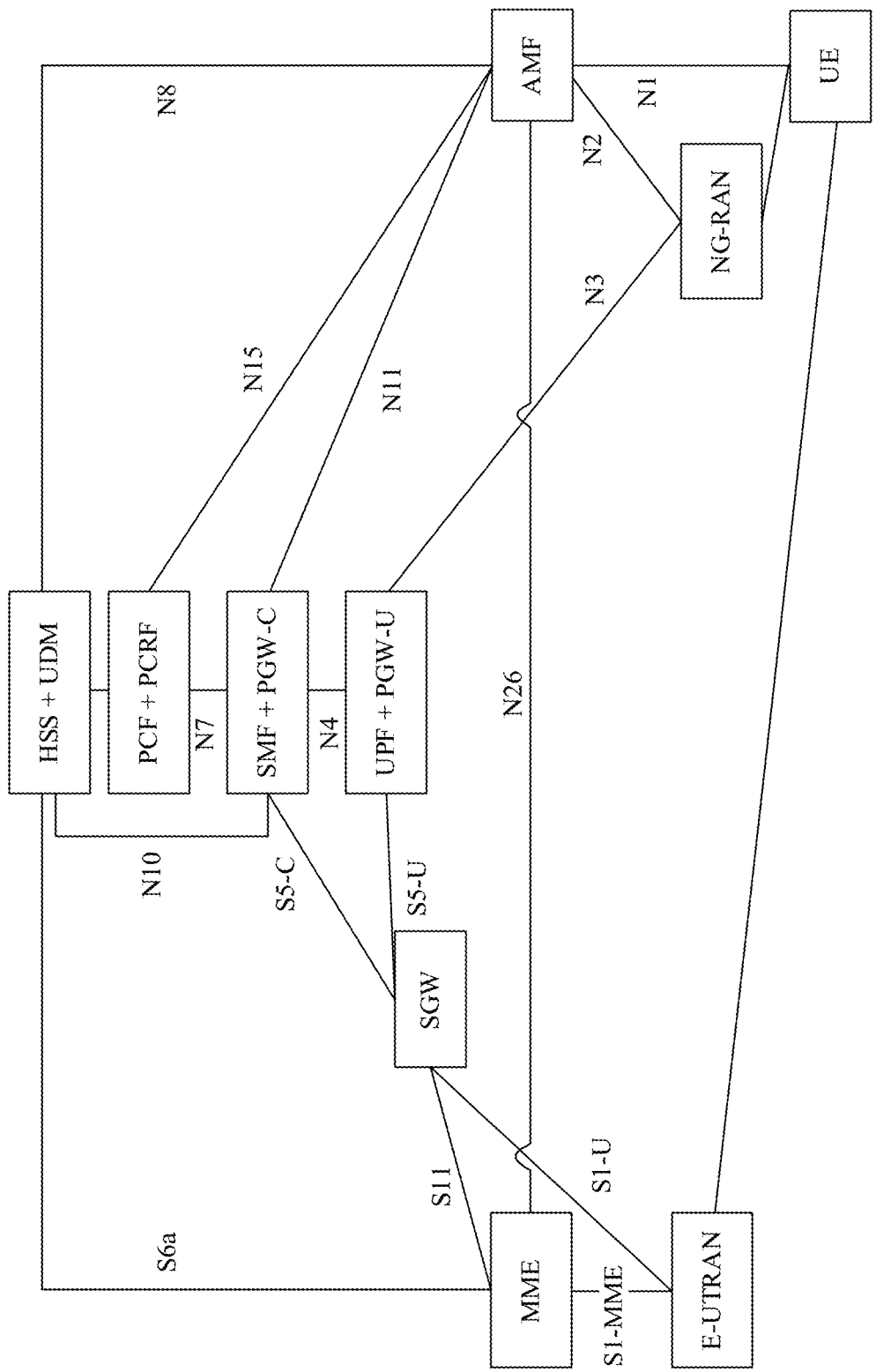
FIG. 1 is a schematic diagram of a network architecture applicable to embodiments of this application.

The embodiments of this application are applicable to a scenario of interworking between a first system and a second system. For example, FIG. 1 shows a network architecture applicable to the embodiments of this application. The network architecture includes a 4G communications system and a 5G communications system. The following describes main network elements in the network architecture.

The 4G communications system (also referred to as a 4G system herein) may include the following network elements.

1. (Radio) access network ((R)AN) network element. The (radio) access network element is configured to provide a network access function for an authorized terminal device in a specific area, and can use transmission tunnels of different quality based on a level of the terminal device, a service requirement, and the like.

The (R)AN network element can manage radio resources and provide an access service for the terminal device, to forward a control signal and terminal device data between the terminal device and a core network. The (R)AN network element may also be understood as a base station in a conventional network. In the 4G communications system, the (R)AN network element may also be referred to as an evolved universal terrestrial radio access network (E-UTRAN) or an evolved NodeB (eNB), which is shown in FIG. 1.

It should be noted that the "network element" may also be referred to as an entity, a device, an apparatus, a module, or the like. This is not particularly limited in this application. In addition, in this application, for ease of understanding and description, the description "network element" is omitted in some descriptions. For example, the (R)AN network element is referred to as a RAN for short. In this case, the "(R)AN network element" should be understood as a (R)AN network element or a (R)AN entity. Descriptions of same or similar cases are omitted below.

2. Mobility management entity (MME). The mobility management entity is configured to provide a mobility management function. In addition, the MME may further provide functions such as lawful interception and access authorization/authentication.

3. Serving gateway (SGW). The serving gateway is configured to provide a function such as user data forwarding.

4. Packet data network gateway for user plane (PGW-U). The packet data network gateway for user plane is configured to provide a user plane function of a PDN gateway.

5. Packet data network gateway for control plane (PGW-C). The packet data network gateway for control plane is configured to provide a control plane function of the PDN gateway.

6. Policy and charging rules function (PCRF). The policy and charging rules function is configured to provide a unified policy framework for guiding network behavior, provide policy rule information for a control-plane function network element, and the like.

7. Home subscriber server (HSS). The home subscriber server includes a user configuration file, is configured to perform user identity authentication and authorization, and can provide information about a physical location of a user.

The 5G communications system (also referred to as a 5G system herein) may include the following network elements.

1. (R)AN network element. The (R)AN network element is configured to provide a network access function for an authorized terminal device in a specific area, and can use transmission tunnels of different quality based on a level of the terminal device, a service requirement, and the like.

In the 5G communications system, the (R)AN network element may also be referred to as a next-generation radio access network (NG-RAN) shown in FIG. 1 or a next-generation base station (gNB).

2. Access and mobility management function (AMF). The access and mobility management function is configured to provide functions of access management and mobility management. In addition, the AMF may further provide functions such as lawful interception and access authorization/authentication.

In a possible design, the AMF may communicate with an MME through an N26 interface. In FIG. 1, a letter and a digit of a connection attachment between network elements indicate a name of a communications interface between the network elements. However, the communications interface between the network elements may further have other names. This is not limited in this application.

3. User plane function (UPF). The user plane function is configured to perform packet routing and forwarding, quality of service (QoS) processing of user plane data, and the like.

4. Session management function (SMF). The session management function is configured to perform session management, internet protocol (IP) address assignment and management of a terminal device, user plane function selection and management. In addition, the SMF may alternatively be a termination point of a policy control and charging function interface.

5. Policy control function (PCF). The policy control function is configured to provide a unified policy framework for guiding network behavior, provide policy rule information for a control-plane function network element (for example, the AMF or the SMF), and the like.

6. Unified data management (UDM) network element. The unified data management network element is configured to manage subscription data. In addition, the unified data management network element is further configured to perform user service registration management, terminal device identifier processing, access authentication, and the like.

In the foregoing network architecture, network elements having same or similar functions may be jointly disposed. For example, the UPF and the PGW-U may be jointly disposed, the SMF and the PGW-C may be jointly disposed, the PCF and the PCRF may be jointly disposed, and the HSS and the UDM may be jointly disposed. In FIG. 1, "+" indicates that two devices may be jointly disposed.

It should be understood that the foregoing network architecture applied to this application is merely an example of a network architecture described from the perspective of a service-based architecture, and a network architecture applicable to the embodiments of this application is not limited thereto. Any network architecture that can implement functions of the foregoing network elements is applicable to the embodiments of this application.

The foregoing network elements or functions may be network elements in a hardware device, or may be software functions run on dedicated hardware, or may be instantiated virtualization functions on a platform (for example, a cloud platform).

The terminal device may interwork from the 4G communications system to the 5G communications system, or may interwork from the 5G communications system to the 4G communications system. The terminal device may include various handheld devices, vehicle-mounted devices, wearable devices, or computing devices that have a wireless communication function, or another processing device connected to a wireless modem, and various forms of terminals, mobile stations (MSs), terminals, user equipment (UEs), software terminals, and the like, for example, a water meter, an electricity meter, and a sensor.

In this application, the terminal device or any one of the foregoing network devices includes a hardware layer, an operating system layer running at the hardware layer, and an application layer running at the operating system layer. The hardware layer includes, for example, hardware such as a central processing unit (CPU), a memory management unit (MMU), and a memory (also referred to as main memory). The operating system may be any one or more computer operating systems for implementing service processing by using a process, for example, a Linux operating system, a Unix operating system, an Android operating system, an iOS operating system, or a windows operating system. The application layer includes applications such as a browser, an address book, word processing software, and instant messaging software. In addition, a specific structure of an execution body of a method according to the embodiments of this application is not specifically limited in the embodiments of this application, provided that communication can be performed according to the method in this application by running a program that records code for performing the method in this application. For example, the method in the embodiments of this application may be performed by the terminal device or the network device, or a function module that is in the terminal device or the network device and that can invoke and execute the program.

It should be noted that, in the embodiments of this application, a plurality of application programs may be run at the application layer. In this case, an application program for performing the method in the embodiments of this application and an application program used to control a receive end device to complete an action corresponding to received data may be different application programs.

The following describes in detail a communication method based on the foregoing network architecture according to this application.

The communication method provided in this application relates to a plurality of network elements, and different network elements correspond to different processing steps. To clearly describe an improvement of each network element, the communication method provided in this application is first described from the perspective of different network elements.

A communication method 200 according to this application is described from the perspective of a session management network element in FIG. 2. The method 200 includes the following steps.

S210. The session management network element determines a first data channel in a first system, where the first data channel is a data channel to be synchronized with a terminal device.

The session management network element may be SMF+PGW-C in FIG. 1. The first system is a 4G system or a 5G system. When the first system is the 4G system, the first data channel is a first evolved packet system (EPS) bearer. When the first system is the 5G system, the first data channel is a first QoS flow.

In this application, terms such as "first" and "second" only represent different individuals of a same type of objects, and constitute no limitation. For example, the first data channel represents one or more data channels, and the first system and a second system represent two different communications systems.

In an operating process of a communications system, due to some reasons, data channel information stored in the session management network element may be different from data channel information stored in the terminal device.

For example, in the first case, when the session management network element deletes the first data channel from the first system and indicates to the terminal device to delete the data channel, if the terminal device is in an idle state or a communication fault occurs, the terminal device cannot receive, in the first system, a message sent by the session management network element. Therefore, the terminal device does not delete the first data channel. Consequently, the data channel information stored in the session management network element is inconsistent with the data channel information stored in the terminal device, and a problem occurs in communication between the session management network element and the terminal device after interworking is performed between communications systems.

In the second case, if the terminal device deletes the first data channel from the first system but does not successfully notify the session management network element, a problem may also occur in communication between the session management network element and the terminal device after interworking is performed between communications systems.

It should be noted that, in this application, a "data channel" may be equivalent to "data channel information". For example, deleting a data channel may be explained as deleting data channel information, and the data channel information is a parameter or configuration information corresponding to the data channel.

To ensure normal communication after interworking is performed between communications systems, the session management network element first needs to determine the first data channel, namely, the data channel to be synchronized with the terminal device, which may also be referred to as a data channel that needs to be synchronized with the terminal device. For the first case, the data channel to be synchronized with the terminal device is a data channel that a network side does not successfully indicate to the terminal device to delete. For the second case, the data channel to be synchronized with the terminal device is a data channel that has been deleted by the terminal device but not notified to a network side. Take the second case as an example for description. When the terminal device is located in the 4G system before interworking, the data channel to be synchronized with the terminal device is an EPS bearer that has been deleted by the terminal device but not notified to the network side.

For example, the session management network element may determine the first data channel by using a plurality of methods. The following lists several examples in which the session management network element determines the first data channel.

Example 1

The session management network element may obtain first status information from the terminal device. For example, the terminal device sends the first status information to an MME or an AMF. After receiving the first status information, the MME or the AMF sends the first status information to the session management network element. The first status information indicates a status of a data channel in the terminal device. For example, an attach request message, a registration request message, or a session establishment request message that is sent by the terminal device may carry the first status information.

The session management network element may determine the first data channel based on the first status information. For example, the session management network element also stores status information of a data channel. After obtaining the first status information from the MME or the AMF, the session management network element may compare the two pieces of status information, and a data channel corresponding to inconsistent status information is the first data channel.

Example 2

The session management network element sends a protocol configuration option (PCO) to the terminal device. The PCO may include information about the first data channel and/or information about a second data channel, or may include no information. The second data channel is a data channel that is in the second system and that corresponds to the first data channel. For example, when the first data channel is a bearer, the second data channel is a QoS flow mapped from the bearer. When the first data channel is a QoS flow, the second data channel is a bearer mapped from the QoS flow.

The PCO is used to indicate to the terminal device to delete the first data channel and/or the second data channel. The PCO is a parameter for transmitting information between the terminal device and the session management network element. A function of the PCO is similar to that of a container, and the PCO can carry different information. In a transmission process, a network element other than the terminal device and the session management network element does not parse content in the PCO.

If the PCO sent by the session management network element does not arrive at the terminal device, the terminal device does not respond to the PCO. Therefore, the session management network element may determine the first data channel based on a received response message that does not include the PCO, in other words, determine a data channel corresponding to the PCO sent by the session management network element as the first data channel.

The PCO sent by the session management network element may be associated with a PCO sent by the terminal device. An association method may be performing matching by using identifier parameters in PCO information element headers. For example, a PCO information element header sent by the session management network element carries a field "a", and a PCO information element header sent by the terminal device carries a field "b". The field "a" is the same as the field "b", or the field "a" is associated with the field "b". A method for associating the two PCOs is not limited in this application.

The PCO sent by the session management network element may be carried in different messages. A message that carries the PCO is not limited in this application. For example, when the terminal device interworks from a 4G system to a 5G system, a message that carries the PCO may be a bearer deletion request. When the terminal device interworks from a 5G system to a 4G system, a message that carries the PCO may be a service message of an AMF, a NAS message, or the like.

Example 3

The session management network element sends a first message to an MME or an AMF. The first message carries information about one or more data channels, and is used to indicate to the terminal device to delete the one or more data channels. If the session management network element receives a second message from the MME or the AMF, and the second message indicates that the first message is not notified to the terminal device, the session management network element determines that the one or more data channels are the first data channel.

When the terminal device interworks from a 4G system to a 5G system, the first message may be a bearer deletion request. Correspondingly, the second message may be a bearer deletion response, and the bearer deletion response includes indication information indicating that the first message is not notified to the terminal device. A specific form of the indication information is not limited in this application.

When the terminal device interworks from a 5G system to a 4G system, the first message may be a service message of the AMF, a NAS message, or the like. Correspondingly, the second message may be a bearer deletion response, and the bearer deletion response includes indication information indicating that the first message is not notified to the terminal device. A specific form of the indication information is not limited in this application.

The foregoing example is an example in which the session management network element actively determines the first data channel. After actively determining the first data channel, the session management network element may send first indication information to another core network element (for example, the MME and the AMF). The first indication information indicates the first data channel, so that the another core network element synchronizes a local data channel.

As shown in the following example, the session management network element may alternatively determine the first data channel based on indication information sent by another network element.

Example 4

The session management network element receives second indication information from a mobility management network element, and the second indication information indicates the first data channel. In this way, the session management network element does not need to actively determine the first data channel, and therefore load of the session management network element is relieved. A method for determining the first data channel by the mobility management network element is described in detail below.

After determining the first data channel, the session management network element may perform the following step.

S220. The session management network element synchronizes, in an interworking procedure for the terminal device from the first system to the second system, at least one of the first data channel or the second data channel that is in the second system and that corresponds to the first data channel.

The purpose of synchronizing the first data channel and the second data channel is to enable the data channel information stored in the session management network element be the same as the data channel information stored in the terminal device.

For the first case, if the session management network element deletes the first data channel but does not notify the terminal device, the session management network element indicates to the terminal device to delete the first data channel in S220. The session management network element may immediately delete the first data channel after marking the first data channel, and indicate to the terminal device to delete the first data channel after the session management network element can normally communicate with the terminal device. Alternatively, the session management network element may reserve the first data channel after marking the first data channel, and delete the first data channel after indicating to the terminal device to delete the first data channel.

An operation in the first case is further described with reference to FIG. 5A and FIG. 5B and FIG. 7A and FIG. 7B.

For the second case, if the terminal device deletes the first data channel but does not notify the session management network element, in a possible implementation, the session management network element deletes, in S220, at least one of the information about the locally stored first data channel or the information about the locally stored second data channel that is in the second system and that corresponds to the first data channel. For example, when the first system is a 4G system, and the second system is a 5G system, the information about the first data channel includes information about an EPS bearer, and the information about the second data channel includes information about a QoS flow associated with the EPS bearer. The information about the EPS bearer may be an identifier of the EPS bearer or a QoS parameter of the EPS bearer. The information about the QoS flow may be a QoS rule or a QoS parameter. Alternatively, when the first system is a 5G system, and the second system is a 4G system, the information about the first data channel includes information about a QoS flow, and the information about the second data channel includes information about an EPS bearer associated with the QoS flow.

For the second case, in another possible implementation, the session management network element may trigger a session modification procedure in the interworking procedure for the terminal device from the first system to the second system. The session modification procedure is used to synchronize the first data channel and/or the second data channel. To synchronize a QoS flow in the 5G communications system, the session modification procedure may be a protocol data unit (PDU) session modification procedure, or may be a PDU session release procedure or a PDU session deactivation procedure. To synchronize a bearer in the 4G communications system, the session modification procedure may be a bearer modification procedure or a bearer deactivation procedure.

For the second case, in still another possible implementation, the foregoing two implementations may be combined. For example, the session management network element may release the first data channel, and delete the information about the locally stored second data channel. An example in which the terminal device interworks from the 4G communications system to the 5G communications system is used. The SMF may release an EPS bearer that the terminal device does not successfully indicate to the network side to delete, and delete a locally stored QoS rule and QoS parameter of a QoS flow corresponding to the EPS bearer.

An operation in the second case is further described with reference to FIG. 11.

Therefore, according to the method in this embodiment of this application, pieces of data channel information stored in communications devices are consistent after interworking is performed between the communications systems. This avoids a case in which a communication failure may occur after interworking is performed between the communications systems.

The communication method provided in this application is described above from the perspective of the session management network element. In addition, with reference to the description of the example 1 in step S210 in FIG. 2, this application further discloses a communication method performed by a terminal device. The method includes determining, by the terminal device, a first data channel that has been deleted by the terminal device in a first system but not notified to a network side; and sending, by the terminal device, first status information to a session management network element, where the first status information indicates a status of a data channel in the terminal device, and the first status information is used for determination of the first data channel.

For example, the terminal device sends the first status information to an MME or an AMF. After receiving the first status information, the MME or the AMF sends the first status information to the session management network element. For example, an attach request message, a registration request message, or a session establishment request message that is sent by the terminal device may carry the first status information. After receiving the first status information, the session management network element may determine the first data channel based on the first status information.

The following describes a communication method according to this application from the perspective of a mobility management network element.

Similar to the session management network element, the mobility management network element also stores data channel information. Therefore, when data channel information stored in a terminal device is different from the data channel information stored in the mobility management network element, the mobility management network element also needs to perform synchronization processing. For example, the mobility management network element may perform the following steps according to a method 300 shown in FIG. 3.

S310. The mobility management network element in a second system determines a first data channel in a first system, where the first data channel is a data channel to be synchronized with a terminal device.

Meanings of the first system, the second system, and the first data channel are the same as those of corresponding terms in the method 200, and details are not described herein again. When the second system is a 4G system, the mobility management network element in the second system is an MME. When the second system is a 5G system, the mobility management network element in the second system is an AMF.

The mobility management network element may actively determine the first data channel. Optionally, after determining the first data channel, the mobility management network element may instruct a session management network element. Alternatively, the mobility management network element may wait for an instruction of a session management network element, and determine the first data channel according to the instruction of the session management network element. The following separately describes the foregoing cases.

Case 1. The mobility management network element actively determines the first data channel.

The mobility management network element in the second system receives first status information from the terminal device, and the first status information indicates a status of a data channel in the terminal device. The mobility management network element in the second system receives second status information from a mobility management network element in the first system, and the second status information indicates a status of a data channel in the terminal device. The mobility management network element in the second system determines the first data channel based on the first status information and the second status information.

The two pieces of status information are data channel information stored in different network elements. The mobility management network element in the second system may compare the statuses of the data channels that are indicated by the two pieces of status information, and determine a data channel corresponding to a different status as the first data channel.

For example, when the terminal device interworks from a 4G system to a 5G system, the mobility management network element in the second system is an AMF. The AMF may obtain the second status information from an MME through an N26 interface, and the AMF may obtain the first status information through an Ni interface, to determine the first data channel.

Optionally, the AMF may send second indication information to the session management network element, to indicate a second data channel. In this way, load of the session management network element is relieved.

For another example, when the terminal device interworks from a 5G system to a 4G system, the mobility management network element in the second system is an MME. The MME may obtain the second status information from an AMF through an N26 interface, and the AMF may obtain the first status information from the terminal device through an E-UTRAN, to determine the first data channel.

Optionally, the MME may send second indication information to the session management network element, to indicate a second data channel. In this way, load of the session management network element is relieved.

Case 2. The mobility management network element determines the first data channel according to the instruction of the session management network element.

The mobility management network element in the second system may receive first indication information from the session management network element. The first indication information indicates the first data channel, so that the mobility management network element can determine the first data channel. A method for determining the first data channel by the session management network element is described in the method 200, and details are not described herein again.

Regardless of whether the method for determining the first data channel by the mobility management network element in the second system is the case 1 or the case 2, the mobility management network element may send the first status information to the session management network element, so that the session management network element determines the first data channel.

After determining the first data channel, the mobility management network element in the second system may perform the following step.

S320. The mobility management network element in the second system synchronizes, in an interworking procedure for the terminal device from the first system to the second system, at least one of the first data channel or the second data channel that is in the second system and that corresponds to the first data channel.

For example, the session management network element may trigger a PDU session modification procedure or a PDU session release procedure, and the AMF may synchronize the first data channel and/or the second data channel in the PDU session modification procedure or the PDU session release procedure. The session management network element may trigger a bearer modification procedure or a bearer deactivation procedure, and the MME may synchronize the first data channel and/or the second data channel in the bearer modification procedure or the bearer deactivation procedure.

The mobility management network element may alternatively synchronize the first data channel and/or the second data channel in a PDU session activation procedure triggered by the session management network element.

Optionally, the mobility management network element in the second system may alternatively actively initiate a synchronization procedure. For example, the mobility management network element in the second system initiates a session modification procedure to the session management network element in the second system after the terminal device interworks from the first system to the second system. The session modification procedure is used to synchronize the at least one of the first data channel or the second data channel that is in the second system and that corresponds to the first data channel.

The session modification procedure may be a PDU session modification procedure, or may be a PDU session release procedure, or may be a bearer modification procedure or a bearer deactivation procedure.

In addition, the mobility management network element in the second system may alternatively synchronize the first data channel and/or the second data channel by using a session deletion procedure.

The communication method provided in this application is described above from the perspective of the core network element. The following describes a communication method according to this application from the perspective of a terminal device.

Similar to the core network element, the terminal device also stores data channel information. Therefore, when the data channel information stored in the terminal device is different from data channel information stored in the core network element, the terminal device also needs to perform synchronization processing. For example, the terminal device may perform the following steps according to a method 400 shown in FIG. 4.

S410. The terminal device determines a first data channel in a first system, where the first data channel is a data channel to be synchronized with a session management network element.

Meanings of the first system, a second system, and the first data channel are the same as those of corresponding terms in the method 200, and details are not described herein again.

The terminal device may determine the first data channel in the following several manners.

Manner 1

The reason why there is a data channel to be synchronized by the terminal device may be that the terminal device does not receive a message that is for deleting the first data channel and that is sent by a core network element. For example, the terminal device is in an idle state or a communication fault occurs. In this case, the terminal device may determine the first data channel according to an indication of the core network element. For details, refer to the embodiments in the method 200 and the method 300. For example, in the manner 1, the data channel to be synchronized with the session management network element may also be referred to as a data channel that needs to be synchronized with the session management network element. For example, the data channel to be synchronized with the session management network element is a data channel that has been deleted by the session management network element but not notified to the terminal device.

To avoid a communication problem caused by the foregoing case, in a possible implementation, the terminal device may send first status information to the core network element in a procedure of interworking between communications systems, and the first status information indicates a status of a data channel in the terminal device, so that the core network element determines, based on the first status information, the data channel that needs to be synchronized (namely, the first data channel).

Alternatively, in another possible implementation, the terminal device may determine the first data channel based on received second status information. The second status information indicates a status of a data channel in the session management network element. This is further described with reference to FIG. 12. For example, the terminal device may actively request to obtain the second status information after interworking is performed between the communications systems or in a procedure of interworking between the communications systems.

Manner 2

The reason why there is a data channel to be synchronized by the terminal device may be that the terminal device actively deletes the first data channel but does not successfully notify the core network element. For example, the terminal device sends a notification message to the session management network element, and the notification message is used to notify the session management network element that the terminal device deletes one or more data channels. If the terminal device does not receive a response message of the notification message, the terminal device may determine the one or more data channels as the first data channel.

Manner 3

The terminal device may alternatively obtain the first data channel in the following manner. The terminal device sends a PCO to the session management network element. If the terminal device does not receive a response message of the PCO, or a response message received by the terminal device does not include the PCO, it indicates that a problem occurs in communication between the terminal device and the session management network element. In this case, the terminal device may determine the previously deleted one or more data channels as the first data channel. Optionally, the PCO sent by the terminal device includes at least one of information about the first data channel and information about a second data channel.

After determining the first data channel, the terminal device may perform the following step.

S420. The terminal device synchronizes, in an interworking procedure for the terminal device from the first system to the second system, at least one of the first data channel or the second data channel that is in the second system and that corresponds to the first data channel.

If the terminal device deletes the first data channel but does not notify the core network element, the terminal device may indicate to the core network element (for example, the session management network element) to delete the at least one of the information about the first data channel or the information about the second data channel in S420. The terminal device may immediately delete the first data channel after marking the first data channel, and indicate to the core network element to delete the first data channel after the terminal device can normally communicate with the core network element. Alternatively, the terminal device may reserve the first data channel after marking the first data channel, and delete the first data channel after indicating to the core network element to delete the first data channel.

If the core network element deletes the first data channel but does not notify the terminal device, in a possible implementation, the terminal device deletes the at least one of the information about the locally stored first data channel or the information about the locally stored second data channel in S420. For the information about the first data channel or the information about the second data channel, refer to the description in FIG. 2. Details are not described herein again.

In another possible implementation, in the procedure in which the terminal device interworks from the first system to the second system, the terminal device may release the first data channel in a session modification procedure triggered by the core network element. The session modification procedure is used to synchronize the first data channel and/or the second data channel. Similarly, the session modification procedure may be a PDU session modification procedure, or may be a PDU session release procedure, or may be a bearer modification procedure or a bearer deactivation procedure.

For example, after the terminal device interworks from a 4G system to a 5G system, the session management network element may trigger a session modification procedure or a session release procedure. In this procedure, the terminal device synchronizes the first data channel and/or the second data channel. After the terminal device interworks from a 5G system to a 4G system, the session management network element may trigger a bearer modification procedure or a bearer deactivation procedure. In this procedure, the terminal device synchronizes the first data channel and/or the second data channel.

The terminal device may alternatively synchronize the first data channel and/or the second data channel in a PDU session deactivation procedure that is initiated by the session management network element and triggered after the terminal device interworks from the first system to the second system.

The terminal device may alternatively initiate a session modification procedure to synchronize the first data channel and/or the second data channel.

Optionally, in S420, the terminal device deletes the at least one of the information about the first data channel or the information about the second data channel.

When the first system is a 4G system, and the second system is a 5G system, the information about the first data channel includes information about an EPS bearer, and the information about the second data channel includes information about a QoS flow associated with the EPS bearer.

Alternatively, when the first system is a 5G system, and the second system is a 4G system, the information about the first data channel includes information about a QoS flow, and the information about the second data channel includes information about an EPS bearer associated with the QoS flow.

The information about the QoS flow may be a QoS rule or a QoS parameter of the QoS flow.

In still another possible implementation, the foregoing two implementations may be combined. For example, the terminal device may release the first data channel, and delete the information about the locally stored second data channel. An example in which the terminal device interworks from the 4G communications system to the 5G communications system is used. The terminal device may release an EPS bearer that a network side did not successfully indicate to the terminal device to delete, and delete a locally stored QoS rule and QoS parameter of a QoS flow corresponding to the EPS bearer.

Figure 5A:
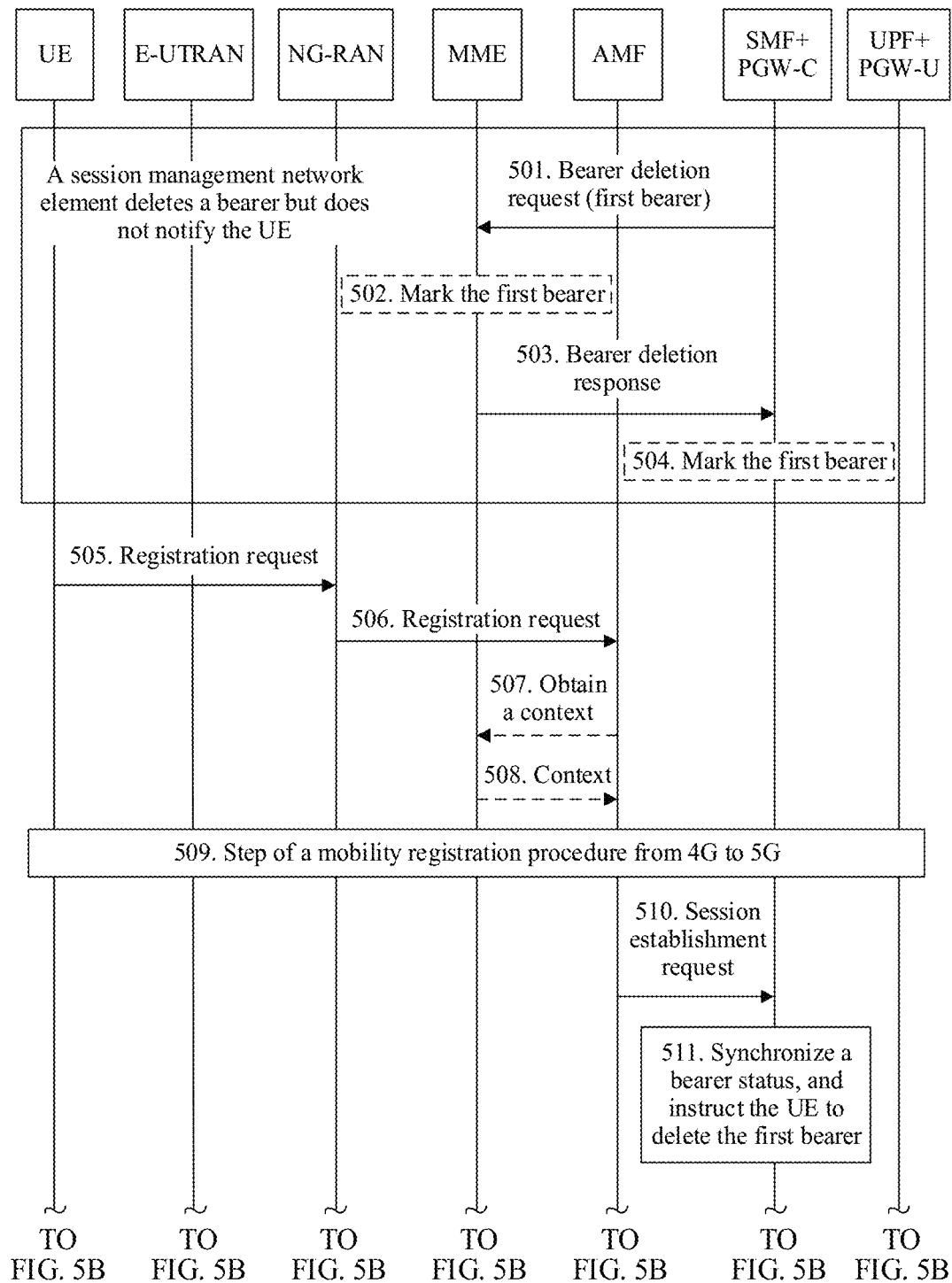
FIG. 5A and FIG. 5B are a schematic diagram of still another communication method according to this application.
Figure 5B:
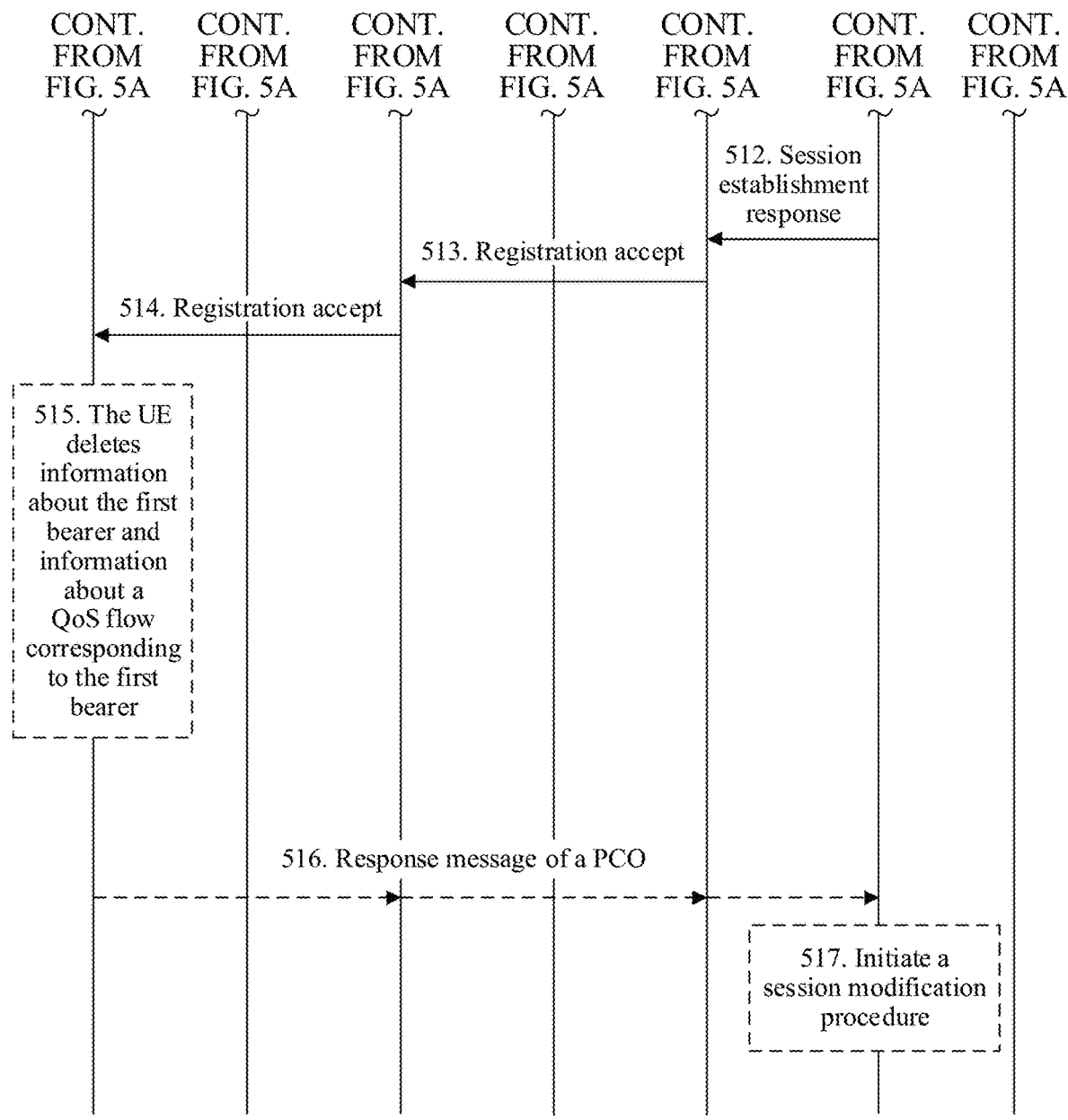

FIG. 5A and FIG. 5B show a communication method according to this application. The method is described by using a scenario in which a terminal device interworks from a 4G system to a 5G system as an example. In addition, the method is also applicable to a scenario in which the terminal device interworks from the 5G system to the 4G system. In addition, the method is applicable to a case in which there is an N26 interface and a case in which there is no N26 interface. The method in FIG. 5A and FIG. 5B is applicable to a case in which SMF+PGW-C deletes a first bearer and/or a first QoS flow but does not notify UE.

As shown in FIG. 5A and FIG. 5B, the method includes the following steps.

501. In a 4G network, the SMF+PGW-C sends a bearer deletion request (delete bearer request) to an MME, to request to delete a first bearer. The first bearer may be one or more bearers. The request may include a PCO, and the PCO may indicate to the UE to delete the first bearer and/or a QoS flow (namely, a first QoS flow) mapped from the first bearer. For example, deleting the first bearer may be understood as deleting a parameter corresponding to the first bearer, and deleting the first QoS flow may be understood as deleting a QoS flow identifier (QFI) and a QoS rule that correspond to the first QoS flow.

If a radio signal is lost or the UE is in an idle state, the MME cannot send the bearer deletion request to the UE.

503. The MME sends a bearer deletion response (delete bearer response) to the SMF+PGW-C.

Optionally, the MME may delete information about the local first bearer based on the bearer deletion request, or may mark the first bearer and then delete the first bearer in a subsequent step.

505. When the UE in an idle state interworks from 4G to 5G, the UE sends a registration request to an NG-RAN. In other words, the UE initiates a mobility registration procedure from 4G to 5G.

506. The NG-RAN sends the registration request of the UE to an AMF.

509. For a process of the mobility registration procedure from 4G to 5G, refer to a communications protocol (for example, 3GPP TS 23.502: "Procedures for the 5G System; Stage 2").

510. The AMF sends a session establishment request to the SMF+PGW-C.

In the method in FIG. 5A and FIG. 5B, the SMF+PGW-C may determine, according to different methods, a to-be-deleted bearer that is not notified to the UE. Then, when the UE interworks to the 5G system, the SMF+PGW-C may indicate to, in a plurality of manners, the UE to delete the to-be-deleted bearer and a QoS flow mapped from the bearer.

For example, the SMF+PGW-C may determine, according to any one of the following methods, the to-be-deleted bearer (namely, the first bearer) that is not notified to the UE.

Method a. The registration request sent in steps 505 and 506 carries indication information 1. The indication information 1 may indicate an EPS bearer status and/or a QoS flow status on the UE. In this case, the indication information 1 is the first status information described above. The session establishment request in step 510 carries the indication information 1 sent by the UE. For example, the indication information 1 is included in the session establishment request message, a PCO in the session establishment request message, or another message, and then is sent to the UE. After receiving the session establishment request, the SMF+PGW-C may determine the first bearer based on the indication information 1. For example, the SMF+PGW-C may determine that a bearer in which a bearer indicated by the indication information 1 is different from a local bearer of the SMF+PGW-C is the first bearer.

Method b (applicable to a case in which there is an N26 interface between the AMF and the MME). After receiving the bearer deletion request in step 501, the MME finds that the MME cannot be connected to the UE. In this case, the MME may mark the first bearer in step 502. For example, the reason why the MME cannot be connected to the UE may be that a radio signal is lost, the UE enters an idle state, or the like. For example, the MME may store an identifier of the first bearer. The MME may mark the first bearer by using another method alternatively. For example, the MME binds or maps the identifier of the first bearer to a specific field. Alternatively, the MME modifies some fields in a context of the first bearer. Alternatively, the MME records or stores a bearer ID that is not sent to the UE. A method for marking the first bearer by the MME is not limited in this application.

After receiving the registration request in step 506, the AMF requests to obtain a context of the UE from the MME through the N26 interface in step 507. Then, in step 508, the MME sends the context of the UE to the AMF. In a possible implementation, the context may include indication information 2, and the indication information 2 indicates the first bearer marked by the MME. For example, the indication information 2 may be carried in an EPS bearer status of the context. Optionally, in another possible implementation, the MME may independently send the indication information 2 to the AMF. A specific form and a sending manner of the indication information 2 are not limited in the present disclosure. After obtaining the indication information 2 from the MME, the AMF sends the indication information 2 to the SMF+PGW-C by using the session establishment request in step 510.

The SMF+PGW-C may determine the first bearer based on the indication information 2. Because a bearer indicated by the indication information 2 is a bearer marked by the MME, the bearer indicated by the indication information 2 is the first bearer.

Therefore, steps 502, 507, and 508 in FIG. 5A and FIG. 5B are optional steps.

Method c (applicable to a case in which there is an N26 interface between the AMF and the MME). With reference to the method a and the method c, the session establishment request in step 510 carries both the indication information 1 and the indication information 2, the SMF+PGW-C may determine the first bearer by using both the indication information 1 and the indication information 2, to avoid missing a bearer that needs to be synchronized.

Method d. After receiving the bearer deletion response in step 503, the SMF+PGW-C may determine, in step 504, that the first bearer needs to be synchronized.

For example, the MME may select one of the following three processing manners to execute, so that the SMF+PGW-C can determine, in step 504, that the first bearer needs to be synchronized.

The MME may add the identifier of the first bearer to the bearer deletion response. After receiving the bearer deletion response, the SMF+PGW-C may determine that the first bearer needs to be synchronized.

Alternatively, the MME may directly send the bearer deletion response. Because the MME is not connected to the UE, the bearer deletion response does not include a PCO sent by the UE. After receiving a response message that does not include the PCO, the SMF+PGW-C may determine that the first bearer in the bearer deletion request needs to be synchronized.

Alternatively, the MME may send individual indication information or an individual cause value to the SMF+PGW-C. The cause value may be a RAN cause value or a non-access stratum (NAS) cause value in some approaches, or may be a new cause value.

Optionally, the SMF+PGW-C may alternatively combine the method d with any one of the methods a, b, and c, to determine that the first bearer needs to be synchronized.

In addition, after determining the first bearer that needs to be synchronized, the SMF+PGW-C may mark the first bearer. For example, the SMF+PGW-C may store the identifier of the first bearer.

For a method for marking the first bearer by the SMF+PGW-C, refer to the method for marking the first bearer by the MME. The SMF+PGW-C may delete the first bearer and/or the first QoS flow after marking the first bearer, or may reserve the first bearer and the first QoS flow and delete the first bearer and/or the first QoS flow after the first bearer and/or the first QoS flow are/is synchronized. If the SMF+PGW-C does not delete the first bearer and/or the first QoS flow in step 504, the SMF+PGW-C may delete the first bearer and/or the first QoS flow in step 511 or step 517.

This application is not limited to the foregoing several methods, and the SMF+PGW-C may also determine, by using another method, the first bearer that needs to be synchronized. As shown in FIG. 5A and FIG. 5B, the method includes the following steps.

511. The SMF+PGW-C indicates to the UE to synchronize a bearer status.

For example, the SMF+PGW-C may indicate to, according to one of the following three methods, the UE to synchronize the bearer status.

(1) The SMF+PGW-C initiates a session modification procedure, namely, step 517. Step 517 may be performed at any time after step 511. The session modification procedure may be a PDU session modification procedure, or may be a PDU session release procedure. In addition, in this manner, in step 512, the SMF+PGW-C sends a session establishment response message to the AMF. In step 513, the AMF sends a registration accept message to the NG-RAN. In step 514, the NG-RAN sends the registration accept message to the UE.

(2) The SMF+PGW-C adds indication information 3 to the session establishment response message in step 512, and correspondingly, the registration accept message in steps 513 and 514 carries the indication information 3. The indication information 3 is used to indicate to the UE to synchronize the bearer status. For example, the indication information 3 indicates to the UE to delete the first bearer and/or the first QoS flow. For example, the indication information 3 may be included in the session establishment response message, a PCO in the session establishment response message, or another message, and then is sent to the UE.

After the UE receives the indication information 3, in step 515, the UE may delete the local first bearer and/or the local first QoS flow based on the indication information 3, or the UE may initiate a session modification procedure based on the indication information 3, to delete the local first bearer and/or the local first QoS flow.

(3) The SMF+PGW-C may send, in steps 512 to 514, the PCO in step 501. Alternatively, after completing an interworking procedure from 4G to 5G (after step 514 and before step 516, which is not shown in the figure), the SMF+PGW-C sends a PCO to the UE again. The PCO may be sent independently, or may be included in another procedure message in 5G and then sent to the UE. The PCO indicates to the UE to delete the first bearer and/or the first QoS flow. After the UE returns a response message of the PCO to the SMF+PGW-C, the SMF+PGW-C may initiate a session modification procedure, so that the UE deletes the first bearer and/or the first QoS flow in the session modification procedure. Step 515 may be performed before or after step 516 in which a response message is sent. In this case, after receiving the response message of the PCO, the SMF+PGW-C determines that the UE has deleted or determined the to-be-deleted first bearer and/or first QoS flow. If the SMF+PGW-C does not delete the locally stored first bearer and/or the locally stored first QoS flow in step 511 and step 504, the SMF+PGW-C may delete the first bearer and/or the first QoS flow in step 517.

Alternatively, the UE may delete the first bearer and/or the first QoS flow in a session modification procedure initiated by the SMF+PGW-C (step 517). If the SMF+PGW-C does not delete the locally stored first bearer and/or the locally stored first QoS flow in step 511 and step 504, the SMF+PGW-C may delete the first bearer and/or the first QoS flow in step 517.

The following describes the following steps in detail with reference to the foregoing three methods for indicating to the UE to synchronize the bearer status in step 511.

512. The SMF+PGW-C sends the session establishment response message to the AMF.

Optionally, if the SMF+PGW-C performs the method (2) in step 511, the session establishment response message includes the indication information 3. The indication information 3 may be individual indication information, or may be information included in the PCO. If the indication information 3 is sent, steps 516 and 517 are not performed.

Optionally, if the SMF+PGW-C performs the method (3) in step 511, the session establishment response message that includes the PCO in step 501 is sent. The PCO indicates to the UE to delete the first bearer and/or the first QoS flow.

513. The AMF sends the registration accept message to the NG-RAN.

Optionally, if the SMF+PGW-C performs the method (2) in step 511, the registration accept message includes the indication information 3. The indication information 3 may be individual indication information, or may be information carried in the PCO.

Optionally, if the SMF+PGW-C performs the method (3) in step 511, the registration accept message includes the PCO in step 501. The PCO indicates to the UE to delete the first bearer and/or the first QoS flow.

514. The NG-RAN sends the registration accept message to the UE.

Optionally, if the SMF+PGW-C performs the method (2) in step 511, the registration accept message includes the indication information 3. The indication information 3 may be individual indication information, or may be information carried in the PCO.

Optionally, if the SMF+PGW-C performs the method (3) in step 511, the registration accept message includes the PCO in step 501. The PCO indicates to the UE to delete the first bearer and/or the first QoS flow.

515. This step is an optional step.

If the SMF+PGW-C performs the method (1) in step 511, step 515 is not performed.

If the SMF+PGW-C performs the method (2) in step 511, the UE deletes the first bearer and/or the first QoS flow based on the indication information 3. Alternatively, the UE initiates the session modification procedure based on the indication information 3. In this case, steps 516 and 517 are omitted.

If the SMF+PGW-C performs the method (3) in step 511, and the UE may directly delete the local first bearer and/or the local first QoS flow, step 515 may be performed before or after step 516, and step 517 may be omitted (the SMF+PGW-C has deleted the locally stored first bearer and/or the locally stored first QoS flow in step 511 or step 504), or the SMF+PGW-C deletes the local first bearer and/or the local first QoS flow in step 517 (the SMF+PGW-C does not delete the locally stored first bearer and/or the locally stored first QoS flow in step 511 and step 504).

If the SMF+PGW-C performs the method (3) in step 511, and the UE needs to delete the local first bearer and/or the local first QoS flow in the session modification procedure initiated by the SMF+PGW-C, step 515 is not performed.

516. The UE sends the response message of the PCO to the SMF+PGW-C, where the response message of the PCO is used to notify the SMF+PGW-C that the UE has determined the to-be-deleted first bearer and/or first QoS flow, or the response message of the PCO is used to notify the SMF+PGW-C that the UE has deleted the local first bearer and/or the local first QoS flow.

517. This step is an optional step.

If the SMF+PGW-C performs the method (3) in step 511, the SMF+PGW-C initiates the session modification procedure after receiving the response message of the PCO in step 516. The session modification procedure is used to trigger the UE to delete the first bearer and/or the first QoS flow. If the SMF+PGW-C does not delete the first bearer and/or the first QoS flow in step 504 or step 511, the SMF+PGW-C may delete the first bearer and/or the first QoS flow in step 517. For a specific procedure, refer to an existing protocol.

If the UE has deleted the local first bearer and/or the local first QoS flow, and the SMF+PGW-C does not delete the first bearer and/or the first QoS flow in step 504 or step 511, the SMF+PGW-C deletes the local first bearer and/or the local first QoS flow in step 517.

If the SMF+PGW-C performs the method (1) in step 511, step 517 may be performed at any time after step 511.

The method shown in FIG. 5A and FIG. 5B is a method for determining a to-be-synchronized data channel by the SMF+PGW-C. Optionally, the SMF+PGW-C may further determine the to-be-synchronized data channel according to the following method. If the SMF+PGW-C initiates a bearer deletion procedure in the 4G system, the SMF+PGW-C marks the bearer deletion procedure initiated by the SMF+PGW-C. After the UE completes a registration procedure in the 5G system, the SMF+PGW-C triggers the session modification procedure, to synchronize a data channel with the UE and the SMF+PGW-C.

For example, before step 501 or after step 501, the SMF+PGW-C records whether the SMF+PGW-C initiates a bearer deletion procedure. If the bearer deletion procedure occurs for a plurality of times in the 4G network (one or more bearers may be deleted in each bearer deletion procedure), the SMF+PGW-C may perform marking for one or more times. If the SMF+PGW-C performs marking only once, the SMF+PGW-C may mark only the first bearer deletion procedure or the last bearer deletion procedure. Then, the SMF+PGW-C may trigger the session modification procedure to synchronize the data channel with the UE and the SMF+PGW-C.

Similarly, if the UE deletes a bearer, the UE records the deleted bearer. After interworking is performed between communications systems, the UE initiates the session modification procedure to perform data channel synchronization processing with a core network element.

Figure 6:
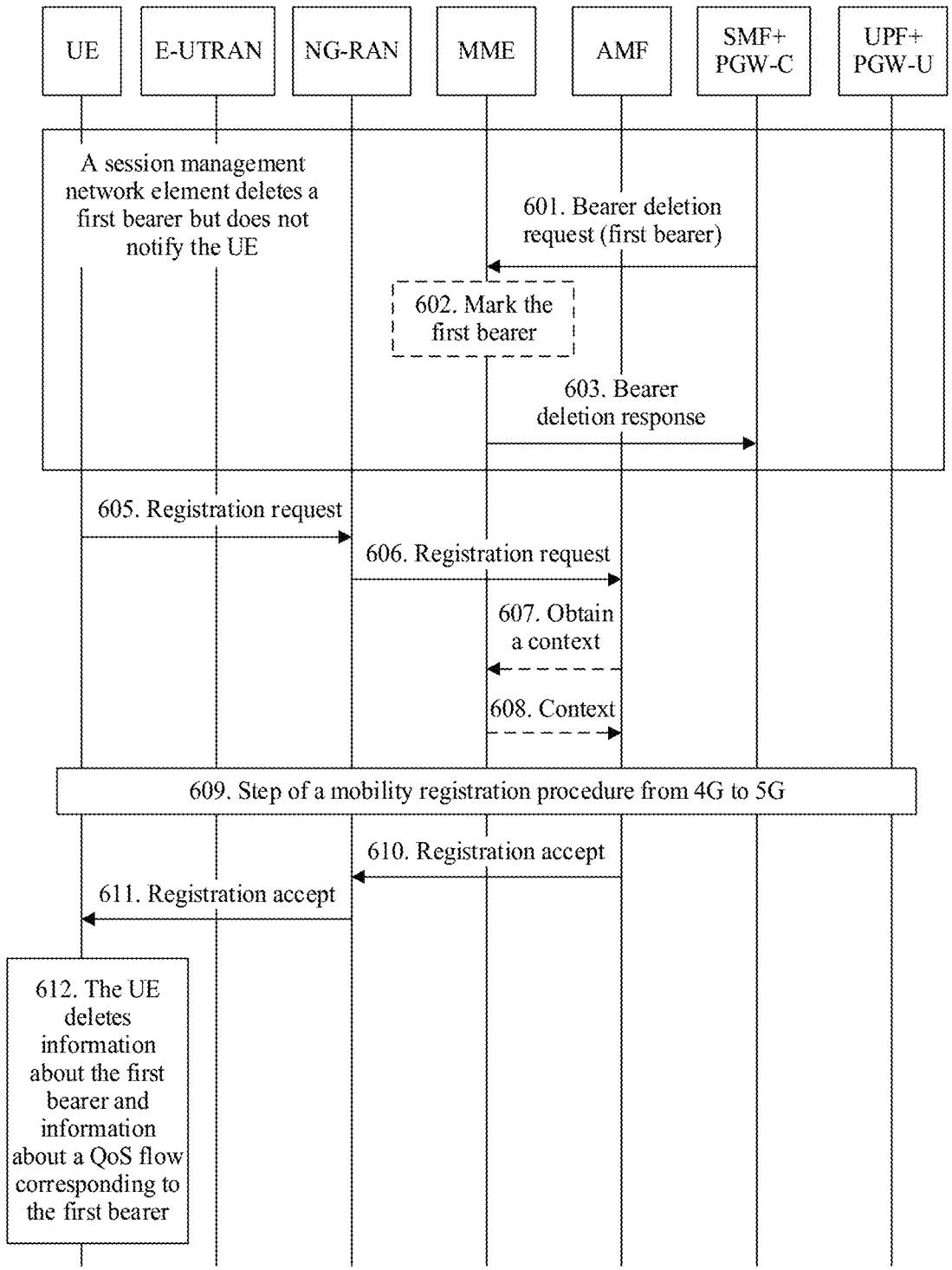
FIG. 6 is a schematic diagram of still another communication method according to this application.

The foregoing embodiment describes the method in which the SMF+PGW-C indicates to the UE to perform synchronization. Optionally, as shown in FIG. 6, the AMF may also indicate to the UE to perform synchronization.

The method is also described by using a scenario in which a terminal device interworks from a 4G system to a 5G system as an example. In addition, the method is also applicable to a scenario in which the terminal device interworks from the 5G system to the 4G system. In addition, the method is applicable to a case in which there is an N26 interface. The method in FIG. 6 is also applicable to a case in which SMF+PGW-C deletes a first bearer and/or a first QoS flow but does not notify UE.

For steps 601 to 603 and steps 605 to 609, refer to the descriptions of steps 501 to 503 and the descriptions of steps 505 to 509 in FIG. 5A and FIG. 5B. Details are not described herein again.

Similarly, the AMF may determine, according to any one of the following methods, the to-be-deleted bearer (namely, the first bearer) that is not notified to the UE.

Method e. The registration request sent in steps 605 and 606 carries the indication information 1 described above. The AMF may determine the first bearer based on the indication information 1. For example, the AMF may determine that a bearer in which a bearer indicated by the indication information 1 is different from a local bearer of the AMF is the first bearer.

Method f. After receiving the bearer deletion request in step 601, the MME finds that the MME cannot be connected to the UE. In this case, the MME may mark the first bearer in step 602. After receiving the registration request in step 606, the AMF requests to obtain a context of the UE from the MME through the N26 interface in step 607. Then, in step 608, the MME sends the context of the UE to the AMF. In a possible implementation, the context may include the indication information 2 described above. The AMF may determine the first bearer based on the indication information 2. Because a bearer indicated by the indication information 2 is a bearer marked by the MME, the bearer indicated by the indication information 2 is the first bearer.

Method g. With reference to the method e and the method f, the AMF may determine the first bearer by using both the indication information 1 and the indication information 2, to avoid missing a bearer that needs to be synchronized. For example, the AMF may first determine that a bearer in which a bearer indicated by the indication information 1 is different from a local bearer of the AMF is a candidate bearer of the first bearer, and then determine the first bearer with reference to the indication information 2, to avoid missing a bearer that needs to be synchronized.

610. The AMF sends a registration accept message to the UE. The registration accept message carries indication information 4, and is used to indicate to the UE to synchronize the first bearer. For example, the indication information 4 may indicate to the UE to delete the first bearer and/or the first QoS flow.

611. The NG-RAN forwards, to the UE, the indication information 4 sent by the AMF. The indication information 4 may directly indicate to the UE to delete the first bearer and/or the first QoS flow, or the indication information 4 may indicate to the UE to initiate a session modification procedure.

612. After receiving the corresponding indication information, the UE deletes the first bearer and/or the first QoS flow, or initiates a session modification procedure, so that the AMF and the SMF+PGW-C perform bearer synchronization.

The foregoing embodiment describes the communication method when the UE interworks from the 4G system to the 5G system. The following describes, with reference to FIG. 7A and FIG. 7B and FIG. 8, a communication method when the UE interworks from the 5G system to the 4G system.

Figure 7A:
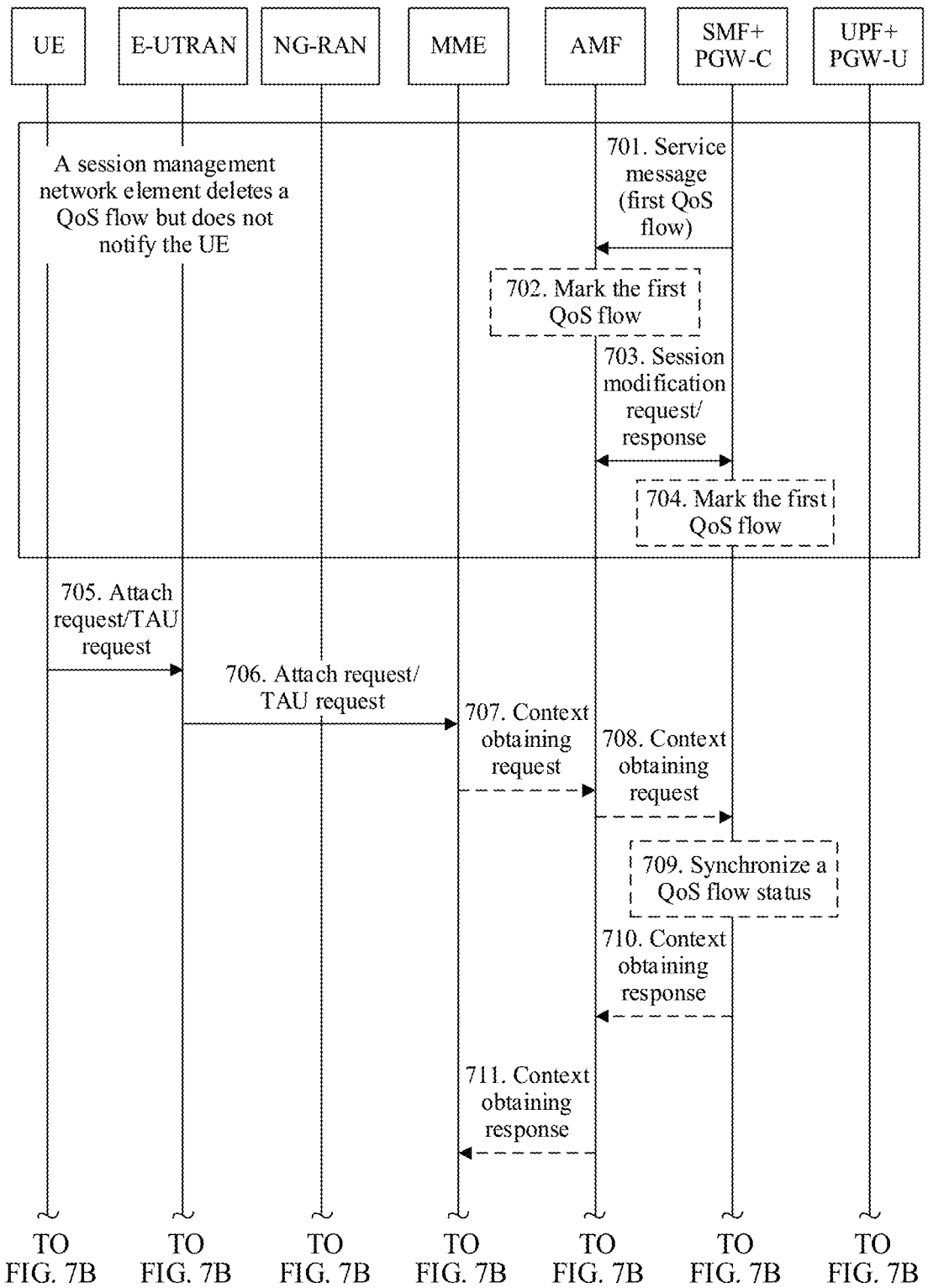
FIG. 7A and FIG. 7B are a schematic diagram of still another communication method according to this application.
Figure 7B:
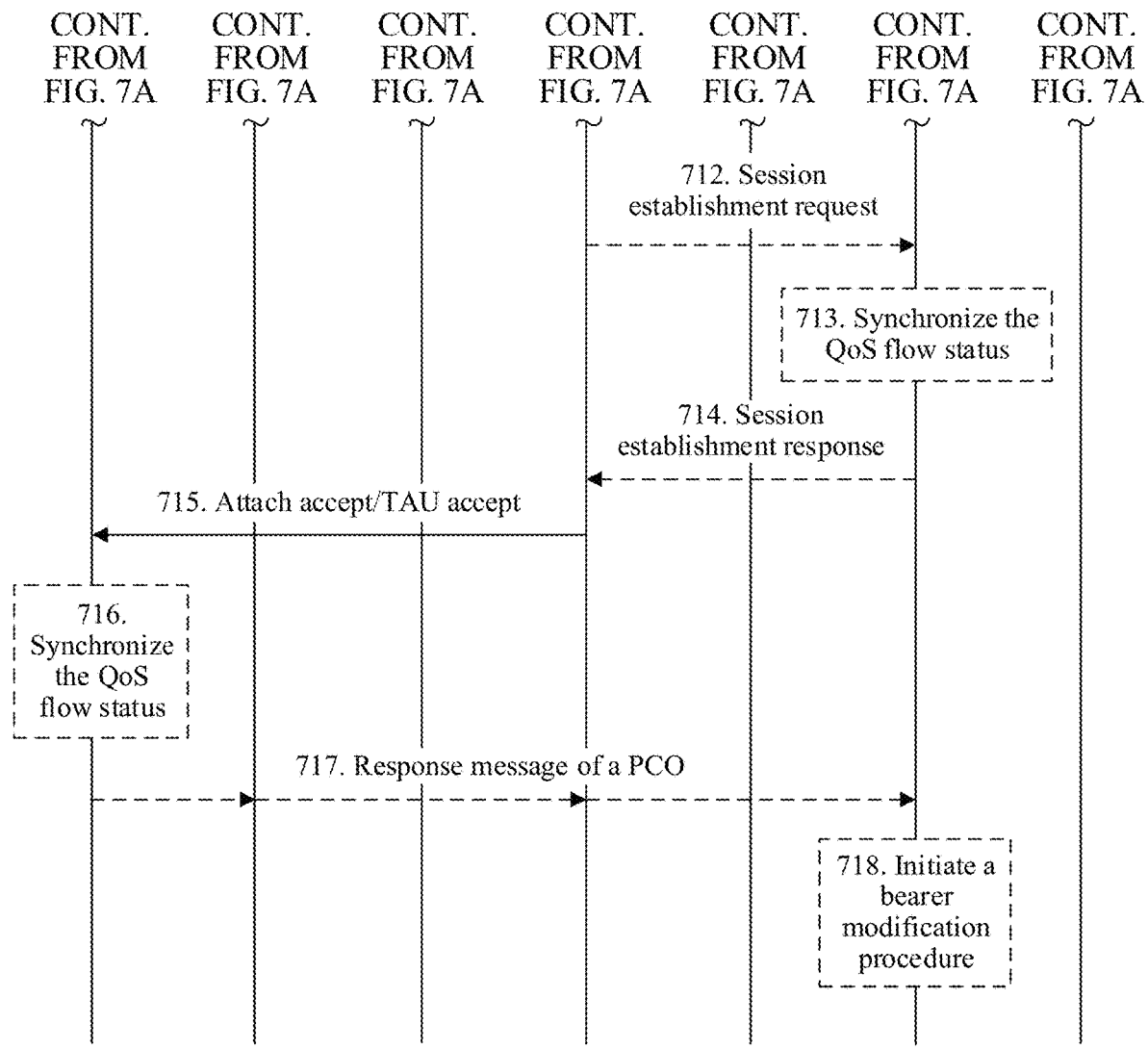

The method shown in FIG. 7A and FIG. 7B is applicable to a scenario in which UE interworks from a 5G system to a 4G system, and is applicable to a scenario in which there is an N26 interface and a scenario in which there is no N26 interface. When the UE is in the 5G system, SMF+PGW-C may mark, according to different methods, a data channel (namely, a first QoS flow) that is to be deleted but not notified to the UE. Then, when the UE interworks to the 4G system, the SMF+PGW-C may indicate to, in a plurality of manners, the UE to delete the first QoS flow and a bearer mapped from the first QoS flow.

As shown in FIG. 7A and FIG. 7B, the method includes the following steps.

701. The SMF+PGW-C sends a service message of an AMF to the AMF by using a 5G system, to indicate to the AMF to delete a first QoS flow. The first QoS flow may be one or more QoS flows. The service message of the AMF may include a PCO. The PCO may indicate to the UE to delete the first QoS flow and/or a bearer (namely, a first bearer) mapped from the first bearer. For example, a parameter corresponding to the first QoS flow is deleted, and a parameter such as an EPS bearer identifier (EBI) corresponding to the first QoS flow is deleted.

If the UE is in an idle state, a session modification message cannot be sent to the UE.

702. The AMF may delete local bearer information based on the service message of the AMF. Alternatively, because the AMF finds that the AMF cannot be connected to the UE (which may be because a radio signal is lost, the UE enters an idle state, or the like), the AMF may first mark the first QoS flow in this step. For example, the AMF may store an identifier of the first QoS flow, and then delete the first QoS flow in a subsequent step.

The AMF may also mark the first QoS flow by using another method. For example, the AMF binds or maps the identifier of the first QoS flow to a specific field. Alternatively, the AMF modifies some fields in a context of the first QoS flow. A method for marking the first QoS flow by the AMF is not limited in this application.

703. The AMF initiates a session modification request to the SMF+PGW-C, and obtains a response message. Optionally, the AMF may notify the SMF+PGW-C that the first QoS flow is not deleted by the UE. A notification method is as follows.

The AMF may add the identifier of the first QoS flow to the session modification request. After receiving the session modification request, the SMF+PGW-C may determine that the first QoS flow needs to be synchronized.

Alternatively, the AMF may directly send the session modification request. Because the AMF is not connected to the UE, the session modification request does not include a PCO sent by the UE. After receiving a response message that does not include the PCO, the SMF+PGW-C may determine that the first QoS flow in the service request needs to be synchronized.

Alternatively, the AMF may send individual indication information or an individual cause value to the SMF+PGW-C. The cause value may be a RAN cause value or a NAS cause value in some approaches, or may be a new cause value.

704. After receiving the session modification request from the AMF, the SMF+PGW-C may mark the first QoS flow. For example, the SMF+PGW-C may store the identifier of the first QoS flow.

Step 704 is an optional step.

For a method for marking the first QoS flow by the SMF+PGW-C, refer to the method for marking the first QoS flow by the AMF. The SMF+PGW-C may delete the first bearer and/or the first QoS flow after marking the first QoS flow, or may reserve the first bearer and the first QoS flow and delete the first bearer and/or the first QoS flow after the first bearer and/or the first QoS flow are/is synchronized.

If the SMF+PGW-C does not delete the first bearer and/or the first QoS flow in step 704, the SMF+PGW-C may delete the first bearer and/or the first QoS flow in step 709, 713, or 718.

It should be noted that steps 701 to 704 are applicable only to a case in which the SMF+PGW-C deletes the first bearer and/or the first QoS flow but does not notify the UE.

705. When the UE in an idle state interworks from the 5G system to the 4G system, if there is no N26 interface, the UE sends an attach request to an E-UTRAN, and steps 707 to 711 are omitted, or if there is an N26 interface, the UE sends a tracking area update (TAU) request to an E-UTRAN, and steps 707 to 711 cannot be omitted.

Optionally, the attach request or the TAU request may include indication information 5, and the indication information 5 may indicate an EPS bearer status, a QoS flow status, and/or the like on the UE. In this case, the indication information 5 is the first status information described above.

In another case, if the UE deletes the first QoS flow but does not notify the SMF+PGW-C, the indication information 5 may indicate the first QoS flow instead of all local QoS flows of the UE. In this case, the UE may indicate an EPS bearer status and/or a QoS flow status on the UE by using the indication information 5.

Optionally, in another implementation, the UE may send the indication information 5 to the SMF+PGW-C by using the PCO.

706. The E-UTRAN sends the attach request or the TAU request of the UE to the AMF. Optionally, the attach request or the TAU request includes the indication information 5 sent by the UE.

707. An MME requests to obtain context information of the UE from the AMF through the N26 interface. Optionally, the context obtaining request may carry the indication information 5.

708. The AMF requests to obtain context information of the UE from the SMF+PGW-C. Optionally, the context obtaining request may carry the indication information 5.

709. The SMF+PGW-C synchronizes a QoS flow status. This step is an optional step.

The SMF+PGW-C may determine a to-be-synchronized QoS flow (namely, the first QoS flow) based on the indication information 5 or the first QoS flow marked in step 704. In addition, the SMF+PGW-C may synchronize the QoS flow status according to one of the following three methods.

(1) The SMF+PGW-C may send indication information 6 to the UE, to indicate to the UE to delete the first bearer and/or the first QoS flow.

(2) The SMF+PGW-C initiates a bearer modification procedure, in other words, performs step 718. Steps 716 and 717 may be omitted.

(3) The SMF+PGW-C may send the PCO in step 701 to the UE in step 710, 711, or 714, or the SMF+PGW-C may send a PCO to the UE again after completing an interworking procedure from the 5G system to the 4G system (after step 715 and before step 717, which is not shown in the figure). The PCO may be sent independently, or may be included in another procedure message in the 4G system and then sent to the UE. The PCO may indicate to the UE to delete the first bearer and/or the first QoS flow. After the UE returns a response message of the PCO to the SMF+PGW-C, the SMF+PGW-C may initiate a bearer modification procedure or a bearer release procedure, and indicates to, in the bearer modification procedure or the bearer release procedure, the UE to delete the first bearer and/or the first QoS flow.

If step 709 is performed, step 713 is omitted. If step 713 is performed, step 709 is omitted. A session establishment response in step 714 includes the indication information 6.

710. The SMF+PGW-C returns the context information of the UE to the AMF. If step 709 is performed, the context information of the terminal may carry the indication information 6.

711. The AMF sends the context information of the UE to the MME.

Optionally, if step 709 is performed, the context information may include the indication information 6. For example, the indication information 6 is carried in EPS bearer status information. The indication information 6 may alternatively be sent to the MME independently.

Optionally, if step 709 is not performed, the context information may include the first QoS flow marked by the AMF. For example, the first QoS flow marked by the AMF is carried in EPS bearer status information. The first QoS flow marked by the AMF may alternatively be sent to the MME independently.

Steps 707 to 711 may be omitted when there is no N26 interface.

712. The MME sends a session establishment request to the SMF+PGW-C by using an SGW (not shown in the figure).

If the context obtaining request in step 707 does not include the indication information 5, the session establishment request in step 712 may include the indication information 5 sent by the UE.

713. A related operation in this step is the same as that in step 709.

If this step is performed, step 709 may be omitted.

If this step is the method (3) in step 709, the PCO is carried in the message in steps 714 and 715.

714. The SMF+PGW-C sends a session establishment response message to the MME.

If the method (1) in step 709 is performed, the session establishment response message may include the indication information 6. The indication information 6 may be individual indication information, or may be information included in the PCO. In this case, steps 717 and 718 are omitted.

If the method (3) in step 709 is performed, the session establishment response message includes the PCO in step 701, and the PCO indicates to the UE to delete the first bearer and/or the first QoS flow.

715. The MME sends an attach accept message or a TAU accept message to the terminal.

If the method (1) in step 709 is performed, the attach accept message or the TAU accept message includes the indication information 6. The indication information 6 may be individual indication information, or may be information included in the PCO.

If the method (3) in step 709 is performed, the attach accept message or the TAU accept message includes the PCO in step 701. The PCO indicates to the UE to delete the first bearer and/or the first QoS flow.

716. This step is an optional step.

If the method (2) in step 709 is performed, this step is omitted.

If the method (1) in step 709 is performed, the UE may delete the first bearer and/or the first QoS flow based on the indication information 6. Alternatively, the UE initiates a bearer modification procedure based on the indication information 6. In this case, steps 716 and 717 are omitted.

If the method (3) in step 709 is performed, and the UE may directly delete the local first bearer and/or the local first QoS flow, step 716 may be performed before or after step 717, and step 718 may be omitted (the SMF+PGW-C has deleted the locally stored first bearer and/or the locally stored first QoS flow in step 511 or step 504), or the SMF+PGW-C deletes the local first bearer and/or the local first QoS flow in step 718 (the SMF+PGW-C does not delete the locally stored first bearer and/or the locally stored first QoS flow in step 511 and step 504).

717. The UE sends the response message of the PCO to the SMF+PGW-C. The response message of the PCO is used to notify the SMF+PGW-C that the UE has determined the to-be-deleted first bearer and/or first QoS flow, or the response message of the PCO is used to notify the SMF+PGW-C that the UE has deleted the local first bearer and/or the local first QoS flow.

718. If the method (2) in step 709 is performed, the SMF+PGW-C may initiate a bearer modification procedure or a bearer release procedure. The bearer modification procedure or the bearer release procedure is used to trigger the UE to delete the first bearer and/or the first QoS flow. If the SMF+PGW-C does not delete the first bearer and/or the first QoS flow in step 704, step 709, or step 713, the SMF+PGW-C may delete the first bearer and/or the first QoS flow in step 718. For a specific procedure, refer to an existing protocol.

If the UE has deleted the local first bearer and/or the local first QoS flow, and the SMF+PGW-C does not delete the first bearer and/or the first QoS flow in step 704, step 709, or step 713, the SMF+PGW-C may delete the local first bearer and/or the local first QoS flow in step 718.

If the method (2) in step 709 is performed, step 718 may be performed at any time after step 709. If step 709 is not performed, and step 713 is performed, step 718 may be performed at any time after step 713.

Optionally, the SMF+PGW-C may alternatively determine a to-be-synchronized data channel according to the following method. If the SMF+PGW-C initiates a QoS flow deletion procedure in the 5G system, the SMF+PGW-C marks the QoS flow deletion procedure initiated by the SMF+PGW-C. After the UE completes a registration procedure in the 4G system, the SMF+PGW-C triggers a bearer modification procedure, to synchronize a data channel with the UE and the SMF+PGW-C.

For example, before step 701 or after step 701, the SMF+PGW-C records an identifier of a bearer QoS flow deletion initiated by the SMF+PGW-C. If a QoS flow deletion procedure occurs for a plurality of times in a 4G network (one or more QoS flows may be deleted in each QoS flow deletion procedure), the SMF+PGW-C may perform marking for one or more times. If the SMF+PGW-C performs marking only once, the SMF+PGW-C may mark only the first QoS flow deletion procedure or the last QoS flow deletion procedure. Then, the SMF+PGW-C may trigger the bearer modification procedure to synchronize the data channel with the UE and the SMF+PGW-C.

Similarly, if the UE deletes a QoS flow, the UE records the deleted QoS flow. After interworking is performed between communications systems, the UE initiates the bearer modification procedure to perform data channel synchronization processing with a core network element.

Figure 8:
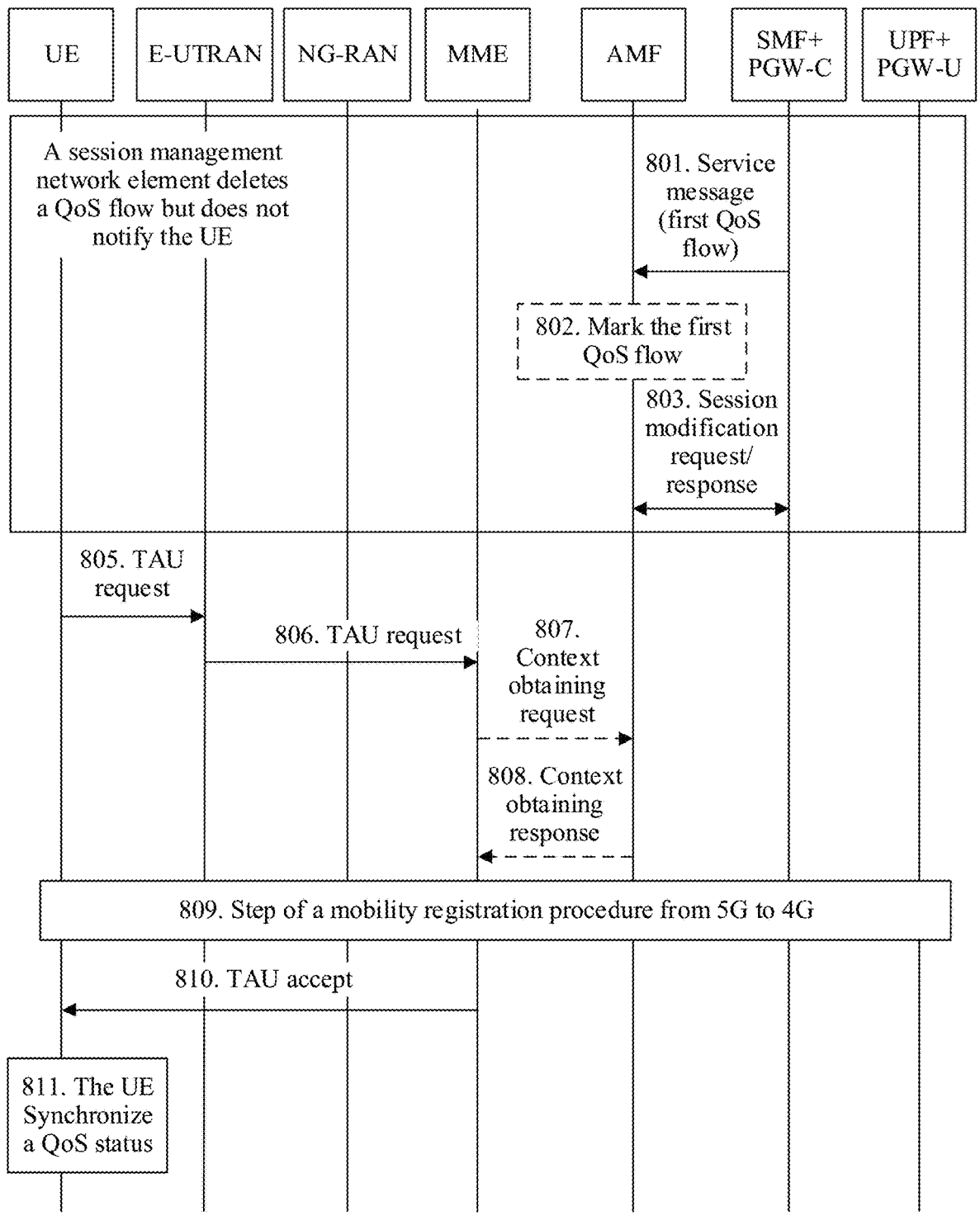
FIG. 8 is a schematic diagram of still another communication method according to this application.

The foregoing embodiment describes the method in which the SMF+PGW-C indicates to the UE to perform synchronization. Optionally, as shown in FIG. 8, the MME may also indicate to the UE to perform synchronization.

The method is applicable to a scenario in which a terminal device interworks from a 5G system to a 4G system, and the method is applicable to a case in which there is an N26 interface.

Steps 801 to 804 are the same as steps 701 to 704, and details are not described herein again.

805. When the UE in an idle state interworks from a 5G system to a 4G system, the UE sends a TAU request to an E-UTRAN.

Optionally, the TAU request includes indication information 5, and the indication information 5 may indicate an EPS bearer status, a QoS flow status, and/or the like on the UE. In this case, the indication information 5 is the first status information described above.

In another case, if the UE deletes the first QoS flow but does not notify the SMF+PGW-C, the indication information 5 may indicate the first QoS flow instead of all local QoS flows of the UE. In this case, the UE may indicate an EPS bearer status and/or a QoS flow status on the UE by using the indication information 5.

Alternatively, the UE may send the indication information 5 to the SMF+PGW-C by using the PCO.

806. The E-UTRAN sends the TAU request of the UE to an MME. Optionally, the TAU request includes the indication information 5 sent by the UE.

809. For a specific process of the mobility registration procedure from 5G to 4G, refer to a communications protocol (for example, 3GPP TS 23.502: "Procedures for the 5G System; Stage 2").

810. The MME sends a TAU accept message to the UE, and the message includes indication information 7. The indication information 7 may directly indicate to the UE to delete the first bearer and/or the first QoS flow, or the indication information 7 may indicate to the UE to initiate a bearer modification procedure or a bearer release procedure.

811. After receiving the corresponding indication information, the UE deletes the first bearer and/or the first QoS flow, or initiates a bearer modification procedure or a bearer release procedure, so that the MME and the SMF+PGW-C perform bearer synchronization.

Optionally, if the UE has deleted the local first bearer and/or the local first QoS flow, or if the UE determines to delete the local first bearer and/or the local first QoS flow but the UE does not notify the SMF+PGW-C, the UE may initiate a bearer modification procedure, and indicates to, in the bearer modification procedure, the SMF+PGW-C to delete the first bearer and/or the first QoS flow that are/is stored in the SMF+PGW-C.

Figure 11:
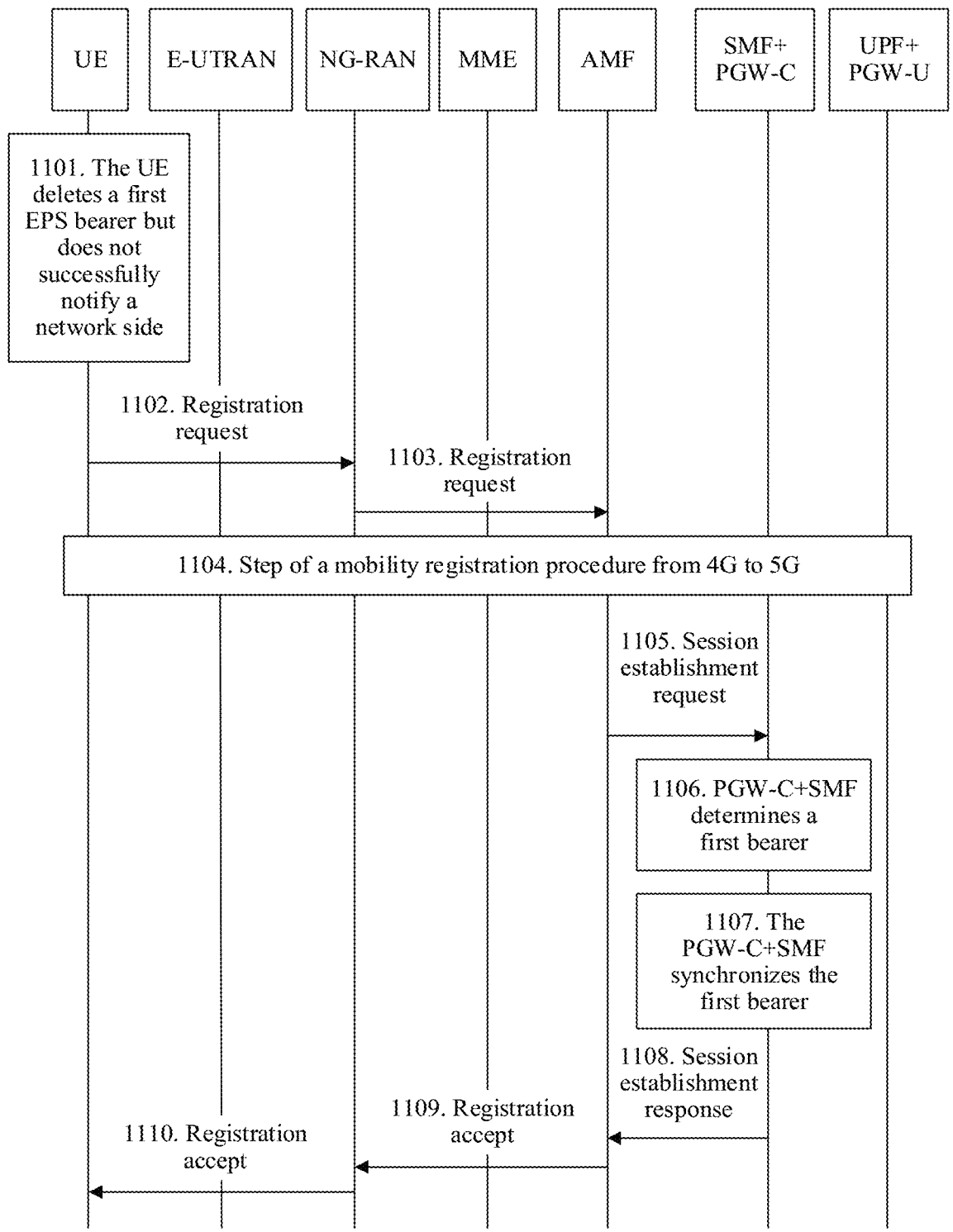
FIG. 11 is a schematic diagram of still another communication method according to this application.

FIG. 11 shows a communication method according to this application. The method is described by using a scenario in which a terminal device interworks from a 4G system to a 5G system as an example. In addition, the method is also applicable to a scenario in which the terminal device interworks from the 5G system to the 4G system. In addition, the method is applicable to a case in which there is an N26 interface and a case in which there is no N26 interface. The method in FIG. 11 is applicable to a case in which UE deletes a first bearer and/or a first QoS flow but does not notify a network side.

1101. The UE deletes a first EPS bearer. However, because the UE is in an idle state, a radio signal is lost, or the like, the UE does not successfully indicate to the network side to delete the first EPS bearer. In other words, a status of the first EPS bearer on the network side is actually to be synchronized with the UE.

1102. When the UE in an idle state interworks from 4G to 5G, the UE sends a registration request to an NG-RAN. Because the UE deletes the first EPS bearer but does not successfully indicate to the network side to delete the first EPS bearer, the registration request includes indication information 5. In a possible implementation, the indication information 5 may indicate a status of the first EPS bearer. In another possible implementation, the indication information 5 may indicate each EPS bearer status (namely, the first status information mentioned above) and/or a QoS flow status on the UE.

1103. The NG-RAN sends the registration request of the UE to an AMF. The registration request includes the indication information 5 sent by the UE.

1104. For a specific process of a mobility registration procedure from 4G to 5G, refer to a communications protocol (for example, 3GPP TS 23.502: "Procedures for the 5G System; Stage 2").

1105. The AMF sends a session establishment request to SMF+PGW-C. The session establishment request carries the indication information 5 sent by the UE. For example, the indication information 5 may be included in a session establishment request message, a PCO in a session establishment response message, or another message, and then is sent to the UE.

1106. The SMF+PGW-C may determine a first bearer based on the indication information 5.

For example, when the indication information 5 indicates each EPS bearer status on the UE, the SMF+PGW-C may determine that a bearer in which a bearer indicated by the indication information 1 is different from a local bearer of the SMF+PGW-C is the first bearer.

Alternatively, when the indication information 5 indicates the status of the first EPS bearer, the SMF+PGW-C may determine that a bearer indicated by the indication information 5 is the first bearer.

1107. The SMF+PGW-C synchronizes a bearer status.

For steps 1106 and 1107, refer to the descriptions of steps S210 and S220 in FIG. 2. Details are not described herein again.

1108. The SMF+PGW-C sends a session establishment response message to the AMF.

1109. The AMF sends a registration accept message to the NG-RAN.

1110. The NG-RAN sends the registration accept message to the UE.

Figure 12:
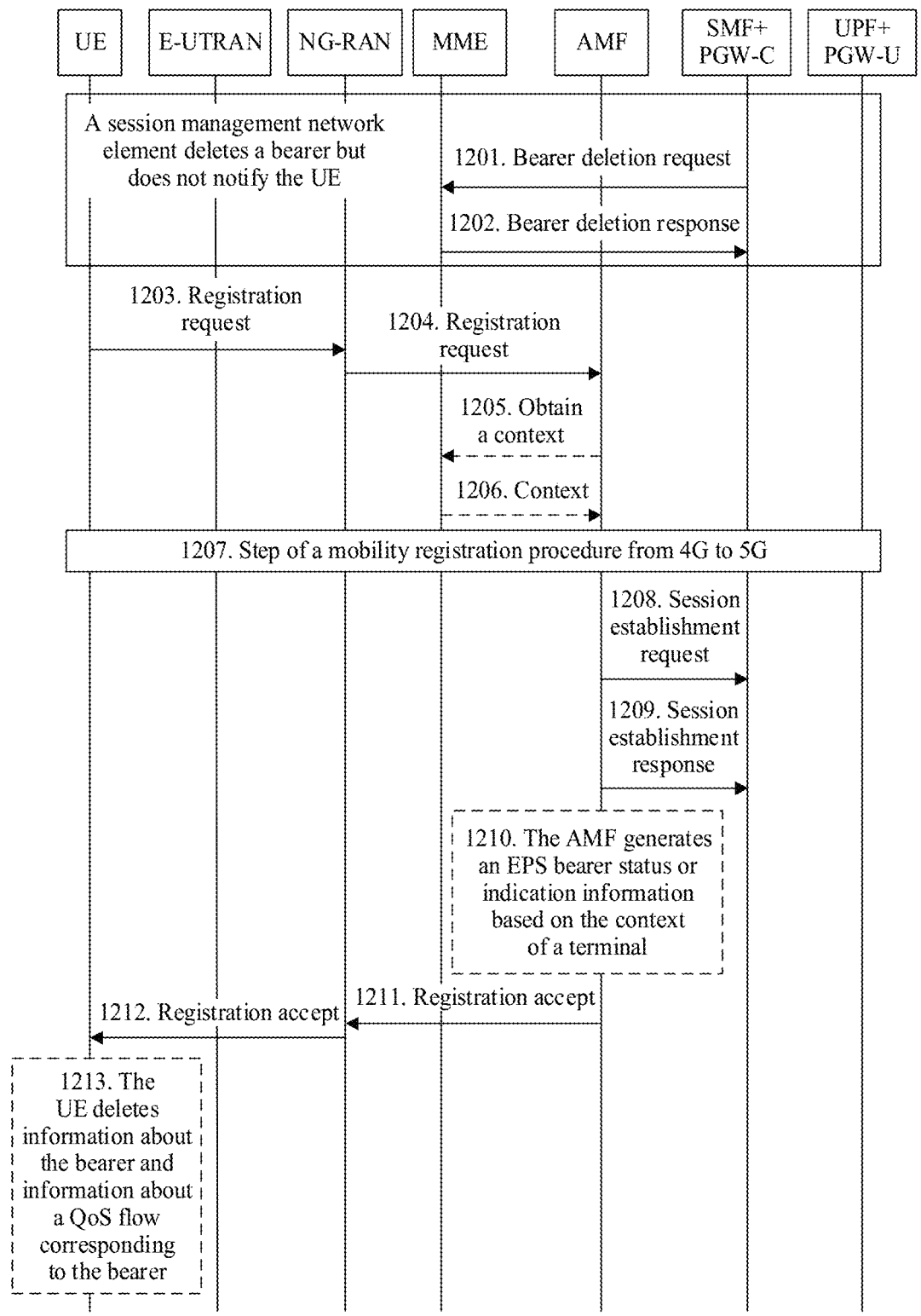
FIG. 12 is a schematic diagram of still another communication method according to this application.

FIG. 12 shows another communication method according to this application. The method is described by using a scenario in which a terminal device interworks from a 4G system to a 5G system as an example. In addition, the method is also applicable to a scenario in which the terminal device interworks from the 5G system to the 4G system. In addition, the method is applicable to a case in which there is an N26 interface and a case in which there is no N26 interface. The method in FIG. 12 is also applicable to a case in which SMF+PGW-C deletes a first bearer and/or a first QoS flow but does not notify UE.

1201. In a 4G network, the SMF+PGW-C sends a bearer deletion request to an MME, to request to delete a first bearer.

1202. The MME sends a bearer deletion response to the SMF+PGW-C.

For steps 1201 and 1202, refer to the descriptions of steps 501 and 503 in FIG. 5A and FIG. 5B. Details are not described herein again.

1203. When the UE in an idle state interworks from 4G to 5G, the UE sends a registration request to an NG-RAN. In other words, the UE initiates a mobility registration procedure from 4G to 5G.

1204. The NG-RAN sends the registration request of the UE to an AMF.

1205. The AMF requests to obtain a context of the UE from the MME through an N26 interface.

1206. The MME sends the context of the UE to the AMF.

Steps 1205 and 1206 are applicable to a scenario in which the N26 interface is supported between the MME and the AMF. When the N26 interface is not supported between the MME and the AMF, steps 1205 and 1206 are not performed.

1207. For a specific process of the mobility registration procedure from 4G to 5G, refer to a communications protocol (for example, 3GPP TS 23.502: "Procedures for the 5G System; Stage 2").

1208. The AMF sends a session establishment request to the SMF+PGW-C.

1209. The SMF+PGW-C sends a session establishment response to the AMF.

In a possible implementation, because the SMF+PGW-C stores a correspondence between an EBI and an allocation and retention priority (ARP), the session establishment response may include the correspondence between the EBI and the ARP.

In another possible implementation, the session establishment response includes an EBI.

It may be understood that the EBI herein is used to identify an EPS bearer that is not deleted on a network side, or is used to identify an EPS bearer that may be handed over during interworking.

1210. The AMF generates EPS bearer status information (namely, the second status information mentioned above).

For example, the AMF may communicate with a plurality of SMF+PGW-Cs, and the AMF may generate EPS bearer status information based on a session establishment response received from each SMF+PGW-C.

For example, the AMF may record, in the EPS bearer status information, a corresponding state of the EBI included in the correspondence that is between the EBI and the ARP and that is carried in the session establishment response message. For example, a character bit of the bearer identified by the EBI is recorded as a value (for example, 1) indicating that the bearer is not deleted. Alternatively, the AMF may generate the EPS bearer status information based on the EBI carried in the session establishment response message. Optionally, the AMF may record, in the EPS bearer status information as a value (for example, 0) indicating that the bearer has been deleted, a character bit of another bearer identified by an EBI that is not carried in the session establishment response message. The bearer identified by the EBI that is not carried in the session establishment response message is a bearer that has been deleted by the SMF+PGW-C, for example, the first bearer.

For example, the EPS bearer status information recorded by the AMF includes information about each EPS bearer associated with a PDN connection, and the first bearer that has been deleted by the SMF+PGW-C is one or more of EPS bearers associated with the PDN connection.

Alternatively, the AMF may not perform step 1210, but only determines, from the received session establishment response, the EBI included in the correspondence between the EBI and the ARP, or determines the EBI from the session establishment response.

Optionally, steps 1209 and 1210 may be replaced with step 1209'.

1209'. The SMF+PGW-C generates EPS bearer status information (namely, the second status information mentioned above), and sends, to the AMF, a session establishment response that carries the EPS bearer status information.

For a manner in which the SMF+PGW-C generates the EPS bearer status information, refer to the manner in which the AMF generates the EPS bearer status information. Details are not described herein again.

1211. The AMF sends a registration accept message to a RAN.

If the AMF performs step 1210 or the SMF performs step 1209', the registration accept message carries the EPS bearer status information.

Otherwise, the registration accept message includes the EBI determined by the AMF. Optionally, the registration accept message may further include address information that is of the SMF+PGW-C and that corresponds to the EBI.

1212. The RAN sends the registration accept message to the UE.

If the AMF performs step 1210, the registration accept message carries the EPS bearer status information.

Otherwise, the registration accept message includes the EBI determined by the AMF. Optionally, the registration accept message may further include address information that is of the SMF+PGW-C and that corresponds to the EBI.

1213. The UE performs synchronization based on the received information.

If the registration accept message includes the EPS bearer status information, the UE compares the EPS bearer status information received from the AMF with locally stored EPS bearer status information. If the UE finds that the EPS bearer status information received from the AMF is different from the locally stored EPS bearer status information, the UE releases the EPS bearer, and deletes QoS flow information (for example, a QFI rule and a QoS parameter) corresponding to the EPS bearer.

If the registration accept message includes the EBI, the UE checks whether the locally stored EPS bearer status information includes the received EBI. If the locally stored EPS bearer status information includes the received EBI, the UE releases the EPS bearer, and deletes QoS flow information (for example, a QFI rule and a QoS parameter) corresponding to the EPS bearer.

Examples of the communication method provided in this application are described above in detail. It may be understood that, to implement the foregoing functions, the communications apparatus includes a corresponding hardware structure and/or software module for performing each of the functions. A person skilled in the art should easily be aware that, in combination with the examples described in the embodiments disclosed in this specification, units and algorithms steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this application, the communications apparatus may be divided into functional units based on the foregoing method examples. For example, each functional unit may be obtained through division based on a corresponding function, or two or more functions may be integrated into one processing unit. The integrated unit may be implemented in a form of hardware, or may be implemented in a form of a software functional unit. It should be noted that the unit division in this application is an example, and is merely logical function division. There may be another division manner during actual implementation.

Figure 9:
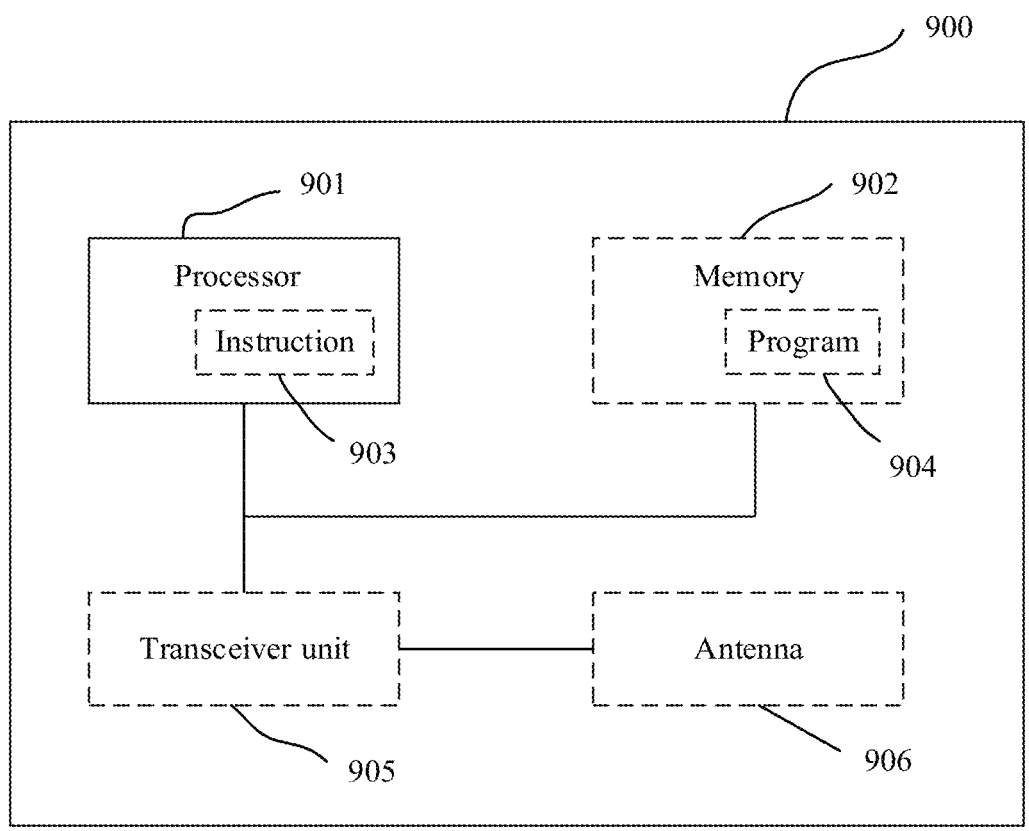
FIG. 9 is a schematic diagram of a communications apparatus according to this application.

FIG. 9 is a schematic structural diagram of a communications apparatus 900 according to this application. The communications apparatus 900 may be configured to implement the methods described in the foregoing method embodiments. The communications apparatus 900 may be a chip, a network device, or a terminal device.

The communications apparatus 900 includes one or more processors 901. The one or more processors 901 may support the communications apparatus 900 in implementing the methods performed by the network device (the session management network element or the mobility management network element) or the terminal device in FIG. 2 to FIG. 8, or FIG. 11 and FIG. 12. The processor 901 may be a general-purpose processor or a dedicated processor. For example, the processor 901 may be a central processing unit (CPU) or a baseband processor. The baseband processor may be configured to process communication data. The CPU may be configured to control the communications apparatus (for example, the network device, the terminal device, or the chip) to execute a software program and process data of the software program. The communications apparatus 900 may further include a transceiver unit 905 configured to input (receive) and output (send) a signal.

For example, the communications apparatus 900 may be the chip, and the transceiver unit 905 may be an input and/or output circuit of the chip, or the transceiver unit 905 may be a communications interface of the chip. The chip may be used as a component of the terminal device, the network device, or another wireless communications device.

The communications apparatus 900 may include one or more memories 902. The memory 902 stores a program 904, and the program 904 may be run by the processor 901 to generate an instruction 903, so that the processor 901 performs, according to the instruction 903, the methods described in the foregoing method embodiments. Optionally, the memory 902 may further store data. Optionally, the processor 901 may further read the data stored in the memory 902. The data and the program 904 may be stored in a same storage address, or the data and the program 904 may be stored in different storage addresses.

The processor 901 and the memory 902 may be separately disposed, or may be integrated, for example, integrated on a board or a system on chip (SOC).

The communications apparatus 900 may further include a transceiver unit 905 and an antenna 906. The transceiver unit 905 may be referred to as a transceiver, or a transceiver circuit, and is configured to implement receiving and sending functions of the communications apparatus by using the antenna 906.

In a possible design, the processor 901 is configured to determine a first data channel in a first system, where the first data channel is a data channel to be synchronized with a terminal device; and synchronize, in an interworking procedure for the terminal device from the first system to a second system, at least one of the first data channel or a second data channel that is in the second system and that corresponds to the first data channel.

In another possible design, the processor 901 is configured to determine a first data channel in a first system, where the first data channel is a data channel to be synchronized with a session management network element; and synchronize, in a procedure in which a terminal device interworks from the first system to a second system, at least one of the first data channel or a second data channel that is in the second system and that corresponds to the first data channel.

For an implementation of the possible design, refer to related descriptions in the foregoing method embodiments.

It should be understood that the steps in the foregoing method embodiments may be implemented by using a logic circuit in a form of hardware or an instruction in a form of software in the processor 901. The processor 901 may be a CPU, a digital signal processor (DSP), an application-specific integrated circuit (ASIC), or a field programmable gate array (FPGA) or another programmable logic device such as a discrete gate, a transistor logic device, or a discrete hardware component.

This application further provides a computer program product. When the computer program product is executed by the processor 901, the communication method described in any one of the method embodiments of this application is implemented.

The computer program product such as the program 904 may be stored in the memory 902. After being preprocessed, compiled, assembled, linked, and the like, the program 904 is finally converted into an executable target file that can be executed by the processor 901.

This application further provides a computer-readable storage medium. The computer-readable storage medium stores a computer program. When the computer program is executed by a computer, the communication method described in any one of the method embodiments is implemented. The computer program may be a high-level language program, or may be an executable target program.

The computer-readable storage medium is, for example, the memory 902. The memory 902 may be a volatile memory or a nonvolatile memory, or the memory 902 may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random-access memory (RAM), and is used as an external cache. By way of example but not limitation, many forms of RAMs may be used, for example, a static RAM (SRAM), a dynamic RAM (DRAM), a synchronous DRAM (SDRAM), a double data rate SDRAM (DDR SDRAM), an enhanced SDRAM (ESDRAM), a synchronous link DRAM (synclink DRAM, SLDRAM), and a direct Rambus RAM (DR RAM).

Figure 10:
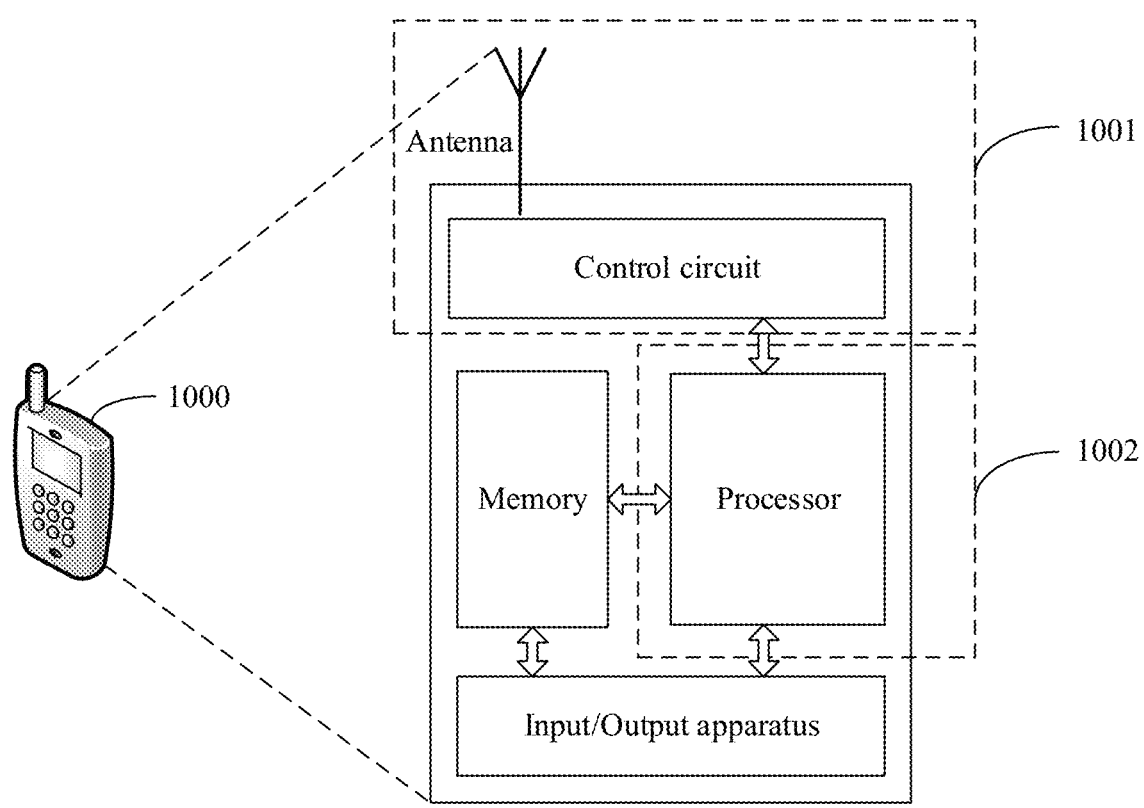
FIG. 10 is a schematic diagram of a terminal device according to this application.

When the communication apparatus 900 is the terminal device, FIG. 10 is a schematic structural diagram of a terminal device 1000 according to this application. The terminal device 1000 is applicable to the system shown in FIG. 1, to implement functions of the terminal device in the method embodiments in FIG. 2 to FIG. 8, or FIG. 11 and FIG. 12. For ease of description, FIG. 10 shows only main components of the terminal device.

As shown in FIG. 10, the terminal device 1000 includes a processor, a memory, a control circuit, an antenna, and an input/output apparatus. The processor is configured to process a communications protocol and communication data, and control the entire terminal device. For example, the processor receives a power saving signal by using the antenna and the control circuit. The memory is configured to store a program and data, for example, store a communications protocol and to-be-sent data. The control circuit is configured to perform conversion between a baseband signal and a radio frequency signal, and process the radio frequency signal. The control circuit and the antenna together may also be referred to as a transceiver, and the transceiver is configured to receive and send a radio frequency signal in a form of an electromagnetic wave. The input/output apparatus is, for example, a touchscreen or a keyboard, and is configured to receive data entered by a user, and output data to the user.

After the terminal device is powered on, the processor may read a program in the memory, explain and execute an instruction included in the program, and process data in the program. When the processor needs to send information by using the antenna, the processor performs baseband processing on the to-be-sent information, and then outputs a baseband signal to a radio frequency circuit. After performing radio frequency processing on the baseband signal, the radio frequency circuit obtains a radio frequency signal, and sends the radio frequency signal in a form of an electromagnetic wave by using the antenna. When the electromagnetic wave (namely, the radio frequency signal) for carrying the information arrives at the terminal device, the radio frequency circuit receives the radio frequency signal by using the antenna, converts the radio frequency signal into a baseband signal, and outputs the baseband signal to the processor. The processor converts the baseband signal into information, and processes the information.

A person skilled in the art may understand that, for ease of description, FIG. 10 shows only one memory and only one processor. An actual terminal device may include a plurality of processors and a plurality of memories. The memory may also be referred to as a storage medium, a storage device, or the like. This is not limited in this application.

In an optional implementation, functions of the baseband processor and the CPU may be integrated into the processor in FIG. 10. A person skilled in the art may understand that the baseband processor and the CPU may be separate processors, and are interconnected by using a technology such as a bus. A person skilled in the art may understand that the terminal device may include a plurality of baseband processors to adapt to different network standards, the terminal device may include a plurality of CPUs to improve a processing capability of the terminal device, and the components of the terminal device may be connected by using various buses. The baseband processor may also be referred to as a baseband processing circuit or a baseband processing chip. The CPU may also be referred to as a central processing circuit or a central processing chip. A function of processing the communications protocol and the communication data may be embedded in the processor, or may be stored in the memory in a form of a program, so that the processor executes the program in the memory to implement a baseband processing function.

In this application, the antenna and the control circuit that have receiving and sending functions may be considered as a transceiver 1001 of the terminal device 1000, and are configured to support the terminal device in implementing the receiving function in the method embodiments or support the terminal device in implementing the sending function in the method embodiments. The processor having a processing function is considered as a processor 1002 of the terminal device 1000. As shown in FIG. 10, the terminal device 1000 includes the transceiver 1001 and the processor 1002. The transceiver may also be referred to as a transceiver apparatus or the like. Optionally, a component that is in the transceiver 1001 and that is configured to implement a receiving function may be considered as a receiver, and a component that is in the transceiver 1001 and that is configured to implement a sending function may be considered as a transmitter. In other words, the transceiver 1001 includes a receiver and a transmitter. The receiver may also be referred to as an input port, a receive circuit, or the like. The transmitter may be referred to as an output port, a transmit circuit, or the like.

The processor 1002 may be configured to execute the program stored in the memory, to control the transceiver 1001 to receive a signal and/or send a signal, so as to complete a function of the terminal device in the foregoing method embodiments. In an implementation, it may be considered that a function of the transceiver 1001 is implemented by using a transceiver circuit or a transceiver-dedicated chip.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, the disclosed system, apparatus and method may be implemented in other manners. For example, some of the features of the described method embodiments may be ignored or not performed. The described apparatus embodiments are merely examples. The unit division is merely logical function division, and there may be other division during actual implementation. For example, a plurality of units or components may be combined or integrated into another system. In addition, coupling between the units or coupling between the components may be direct coupling, or may be indirect coupling. The coupling includes an electrical connection, a mechanical connection, or a connection in another form.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

In addition, the terms "system" and "network" may be used interchangeably in this specification. The term "and/or" in this specification describes only an association relationship for describing associated objects and represents that three relationships may exist. For example, A and/or B may represent the following three cases, only A exists, both A and B exist, and only B exists. In addition, the character "/" in this specification generally indicates an "or" relationship between the associated objects.

In summary, what is described above is merely example embodiments of the technical solutions of this application, but is not intended to limit the protection scope of this application. Any modification, equivalent replacement, or improvement made without departing from the spirit and principle of this application shall fall within the protection scope of this application.

What is claimed is:
1. A communication method, comprising:
receiving, by a mobility management device, status information from a terminal device;
sending, by the mobility management device, the status information to a session management device;
receiving, by the session management device, the status information from the mobility management device;
determining, by the session management device, a first data channel in a first system based on the status information, wherein the first data channel is to be synchronized with the terminal device; and synchronizing, by the session management device, at least one of the first data channel or a second data channel that is in a second system and that corresponds to the first data channel.

2. The method of claim 1, wherein synchronizing at least one of the first data channel or the second data channel the first data channel and the second data channel in an interworking procedure fix the terminal device from the first system to the second system.

3. The method of claim 1, wherein the status information indicates a status of a data channel in the terminal device.

4. The method of claim 1, wherein synchronizing at least one of the first data channel or the second data channel comprises the first data channel.

5. The method of claim 1, wherein synchronizing at least one of the first data channel or the second data channel comprises information about the first data channel.

6. The method of claim 5, wherein the first system is a fourth-generation (4G) system, the second system is fifth-generation (5G) system, the first data channel is an evolved packet system (EPS) bearer, and the second data channel is a quality of service (QoS) flow associated with the EPS bearer.

7. The method of claim 6, wherein the information about the first data channel comprises at least one of an identifier of the EPS bearer or a QoS parameter of the EPS bearer.

8. The method of claim 1, wherein synchronizing at least one of the first data channel or the second data channel comprises deleting information about the second data channel.

9. The method of claim 8, wherein the first system is a fourth-generation (4G) system, the second system is a fifth-generation (5G) system, the first data channel is an evolved packet system (EPS) bearer, and the second data channel is a quality of service (QoS) flow associated with the EPS bearer.

10. The method of claim 9, wherein the information about the second data channel comprises a QoS rule and a QoS parameter of the QoS flow.

11. The method of claim 1, wherein synchronizing at least one of the first data channel or the second data channel comprises triggering a session modification procedure, wherein the session modification procedure synchronizes the at least one of the first data channel or the second data channel.

12. The method of claim 1, wherein synchronizing at least one of the first data channel or the second data channel comprises triggering, in a protocol data unit (PDU) session activation procedure, synchronization of the at least one of the first data channel or the second data channel.

13. The method of claim 1, wherein the first data channel has been deleted by the terminal device but not notified to a network side.

14. The method of claim 1, wherein the first system is a fourth-generation (4G) system, the second system is a fifth-generation (5G) system, the first data channel is an evolved packet system (EPS) bearer, and the second data channel is a quality of service (QoS) flow associated with the EPS bearer.

15. A communication system comprising:
a mobility management device configured to:
receive status information from a terminal device; and
send the status information to a session management device; and
the session management device configured to:
receive the status information from the mobility management device;
determine a first data channel in a first system based on the status information, wherein the first data channel is to be synchronized with the terminal device; and
synchronize at least one of the first data channel or a second data channel that is in a second system and that corresponds to the first data channel.

16. The communication system of claim 15, wherein the session management device configured to synchronize at least one of the first data channel or the second data channel comprises the session management device configured to synchronize the first data channel and the second data channel in an interworking procedure for the terminal device from the first system to the second system.

17. The communication system of claim 15, wherein the status information indicates a status of a data channel in the terminal device.

18. The communication system of claim 15, wherein synchronizing at least one of the first data channel or the second data channel comprises releasing the first data channel.

19. The communication system of claim 15, wherein the session management device configured to synchronize at least one of the first data channel or the second data channel comprises the session management device configured to delete information about the second data channel.

20. The communication system of claim 15, wherein the first system is a fourth-generation (4G) system, the second system is a fifth-generation (5G) system, the first data channel is an evolved packet system (EPS) bearer, and the second data channel is a quality of service (QoS) flow associated with the EPS bearer.

* * * * *

UNITED STATES PATENT AND TRADEMARK OFFICE
CERTIFICATE OF CORRECTION

PATENT NO. : 11,134,371 B2
APPLICATION NO. : 16/845026
DATED : September 28, 2021
INVENTOR(S) : Hao Jing et al.

It is certified that error appears in the above-identified patent and that said Letters Patent is hereby corrected as shown below:

On the Title Page

Item (54) Title and in the Specification, Column 1, Lines 1-2: "Communication Method and Communications Apparatus" should read "Method and Apparatus for Interworking Between Communication Systems"

In the Claims

Claim 2, Column 43, Line 6: "data channel the" should read "data channel comprises synchronizing the"

Claim 2, Column 43, Line 8: "procedure fix the terminal" should read "procedure for the terminal"

Claim 4, Column 43, Line 14: "comprises the first data" should read "comprises releasing the first data"

Claim 5, Column 43, Line 17: "comprises information" should read "comprises deleting information"

Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*